United States Patent
Raghavan et al.

(10) Patent No.: US 12,278,678 B2
(45) Date of Patent: Apr. 15, 2025

(54) METHODS FOR FULL DUPLEX BEAMFORMING AND ONLINE CALIBRATION IN MILLIMETER WAVE SYSTEMS

(71) Applicant: QUALCOMM Incorporated, San Diego, CA (US)

(72) Inventors: Vasanthan Raghavan, West Windsor Township, NJ (US); Juergen Cezanne, Ocean Township, NJ (US); Navid Abedini, Somerset, NJ (US); Bilal Sadiq, Basking Ridge, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/455,694

(22) Filed: Jun. 27, 2019

(65) Prior Publication Data

US 2020/0052753 A1    Feb. 13, 2020

Related U.S. Application Data

(60) Provisional application No. 62/716,949, filed on Aug. 9, 2018.

(51) Int. Cl.
*H04B 7/06*    (2006.01)
*H04B 17/11*    (2015.01)
(Continued)

(52) U.S. Cl.
CPC ......... *H04B 7/0617* (2013.01); *H04B 7/0639* (2013.01); *H04B 7/0695* (2013.01);
(Continued)

(58) Field of Classification Search
CPC .... H04B 7/0617; H04B 7/0639; H04B 17/21; H04B 7/0695; H04B 17/11; H04B 17/19;
(Continued)

(56) References Cited

U.S. PATENT DOCUMENTS

2006/0083389 A1    4/2006    Oxford et al.
2009/0290563 A1*   11/2009   Gu ...................... H04B 7/0691
                                                                375/267
(Continued)

FOREIGN PATENT DOCUMENTS

CN    103875301 A    6/2014
WO    2013028119 A1    2/2013
(Continued)

OTHER PUBLICATIONS

International Search Report and Written Opinion—PCT/US2019/039980—ISA/EPO—Oct. 25, 2019.
(Continued)

*Primary Examiner* — Sam K Ahn
*Assistant Examiner* — Amneet Singh
(74) *Attorney, Agent, or Firm* — Arent Fox, LLP

(57) ABSTRACT

A wireless device, such as a base station, may be configured to determine a set of silent symbols for beam calibration measurements by a User Equipment (UE) for full duplex communication. The wireless device may transmit, to the UE, an indication of the set of silent symbols for the beam calibration measurements by the UE. The wireless device may refrain from transmitting during the set of silent symbols. A wireless device, such as a UE, may receive an indication of a set of silent symbols for a beam calibration measurement by the UE for full duplex communication with a base station. The wireless device may perform beam calibration measurements for beam candidates.

32 Claims, 15 Drawing Sheets

(51) Int. Cl.
*H04B 17/21* (2015.01)
*H04L 5/14* (2006.01)

(52) U.S. Cl.
CPC ............. *H04B 17/11* (2015.01); *H04B 17/21* (2015.01); *H04L 5/143* (2013.01)

(58) Field of Classification Search
CPC ...... H04B 17/12; H04B 7/0874; H04B 7/088; H04B 17/14; H04B 17/18; H04L 5/143; H04W 24/10
See application file for complete search history.

(56) References Cited

U.S. PATENT DOCUMENTS

| | | | |
|---|---|---|---|
| 2010/0150013 A1* | 6/2010 | Hara | H04B 17/12 370/252 |
| 2013/0194950 A1* | 8/2013 | Haghighat | H04L 5/0035 370/252 |
| 2013/0235738 A1* | 9/2013 | Siomina | H04W 72/1263 370/252 |
| 2014/0269520 A1* | 9/2014 | Yi | H04L 5/0051 370/329 |
| 2014/0313986 A1 | 10/2014 | Jeffery et al. | |
| 2014/0328228 A1 | 11/2014 | Park et al. | |
| 2017/0054544 A1* | 2/2017 | Kazmi | H04B 17/309 |
| 2017/0085362 A1* | 3/2017 | Alpert | H04L 5/14 |
| 2017/0207845 A1* | 7/2017 | Moon | H04B 7/088 |
| 2017/0331670 A1 | 11/2017 | Parkvall et al. | |
| 2017/0359114 A1 | 12/2017 | Akkarakaran et al. | |
| 2018/0235013 A1* | 8/2018 | Jung | H04W 16/28 |
| 2019/0349864 A1* | 11/2019 | Zhang | H04W 52/325 |
| 2020/0228180 A1* | 7/2020 | Zhang | H04L 5/0023 |

FOREIGN PATENT DOCUMENTS

| | | |
|---|---|---|
| WO | 2017052937 A1 | 3/2017 |
| WO | 2018031367 A1 | 2/2018 |

OTHER PUBLICATIONS

Nokia et al., "On Procedures for Beam Selection and Feedback Signaling", 3GPP Draft, R1-167287, 3rd Generation Partnership Project (3GPP), Mobile Competence Centre; 650, Route Des Lucioles; F-06921, Sophia-Antipolis Cedex; France, vol. RAN WG1, No. Gothenburg, Sweden; Aug. 22, 2016-Aug. 26, 2016, Aug. 12, 2016 (Aug. 12, 2016), 5 pages, XP051132607, Retrieved from the Internet: URL:http://www.3gpp.org/ftp/tsg_ran/WG1_RL1/TSGR1_86/Docs/.
"3GPP: 3rd Generation Partnership Project; Technical Specification Group Radio Access Network; Evolved Universal Terrestrial Radio Access (E-UTRA); Radio Resource Control (RRC); Protocol specification (Release 10)", TS 36.331 V10.0.0 (Dec. 2010), pp. 1-276.
3GPP TS 36.331: "3rd Generation Partnership Project, Technical Specification Group Radio Access Network, Evolved Universal Terrestrial Radio Access (E-UTRA), Radio Resource Control (RRC), Protocol Specification (Release 10)", 3GPP TS 36.331, V10.1.0 (Mar. 2011), 290 Pages.

* cited by examiner

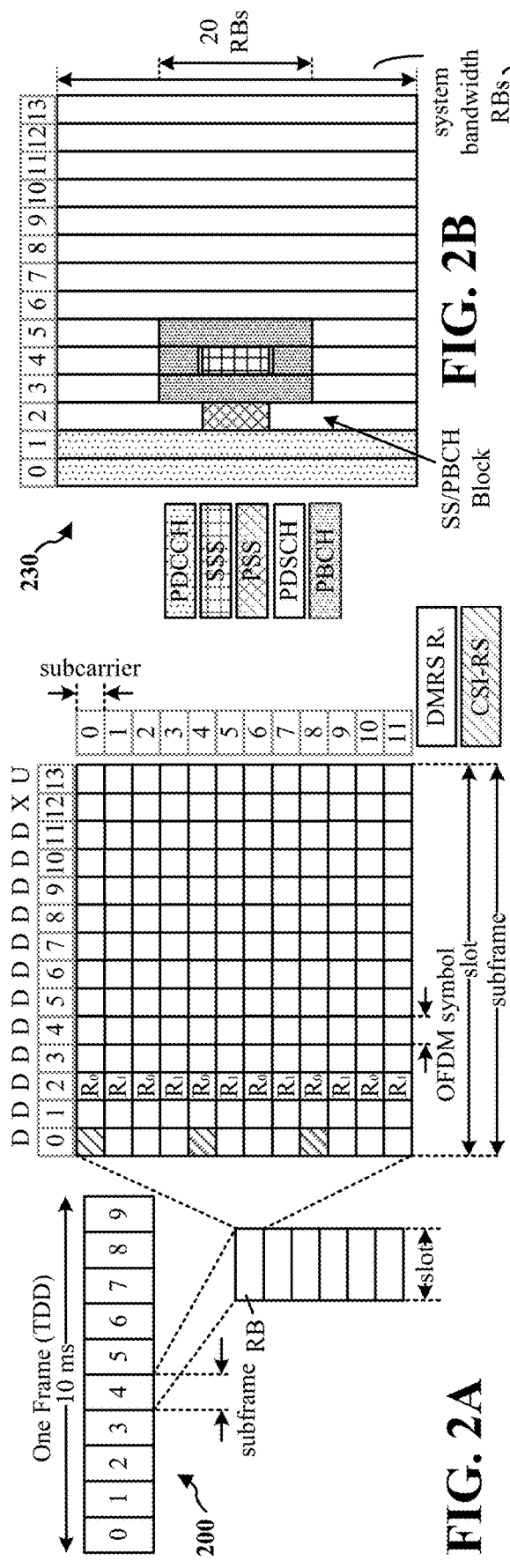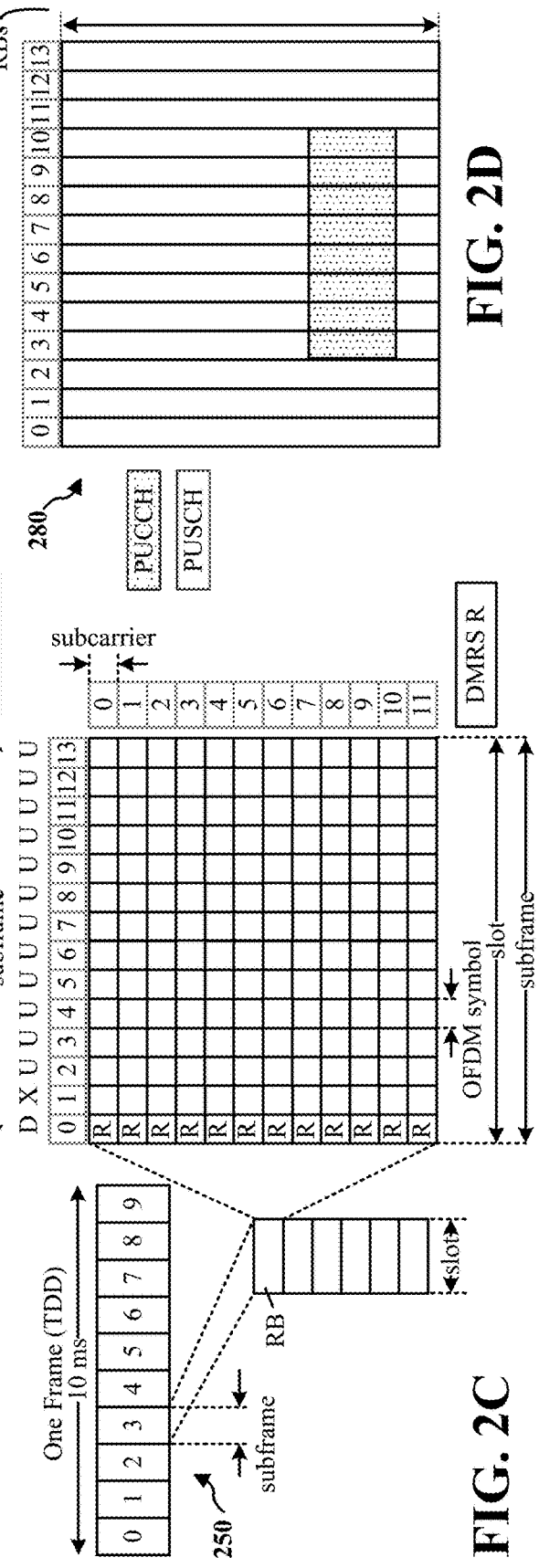
FIG. 2A
FIG. 2B
FIG. 2C
FIG. 2D

METHODS FOR FULL DUPLEX BEAMFORMING AND ONLINE CALIBRATION IN MILLIMETER WAVE SYSTEMS

CROSS-REFERENCE TO RELATED APPLICATION(S)

This application claims the benefit of U.S. Provisional Application Ser. No. 62/716,949, entitled "Methods for Full Duplex Beamforming and Online Calibration in Millimeter Wave Systems" and filed on Aug. 9, 2018, which is expressly incorporated by reference herein in its entirety.

BACKGROUND

Technical Field

The present disclosure relates generally to communication systems, and more particularly, to a millimeter wave (mmW) communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a base station. The apparatus determines a set of silent symbols for beam calibration measurements by a User Equipment (UE) for full duplex communication. The apparatus transmits, to the UE, an indication of the set of silent symbols for the beam calibration measurements by the UE. The apparatus then refrains from transmitting during the set of silent symbols.

In another aspect of the disclosure, a method, a computer-readable medium, and an apparatus are provided for wireless communication at a UE. The apparatus receives an indication of a set of silent symbols for a beam calibration measurement by the UE for full duplex communication with a base station. The apparatus then performs beam calibration measurements for the beam candidates.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
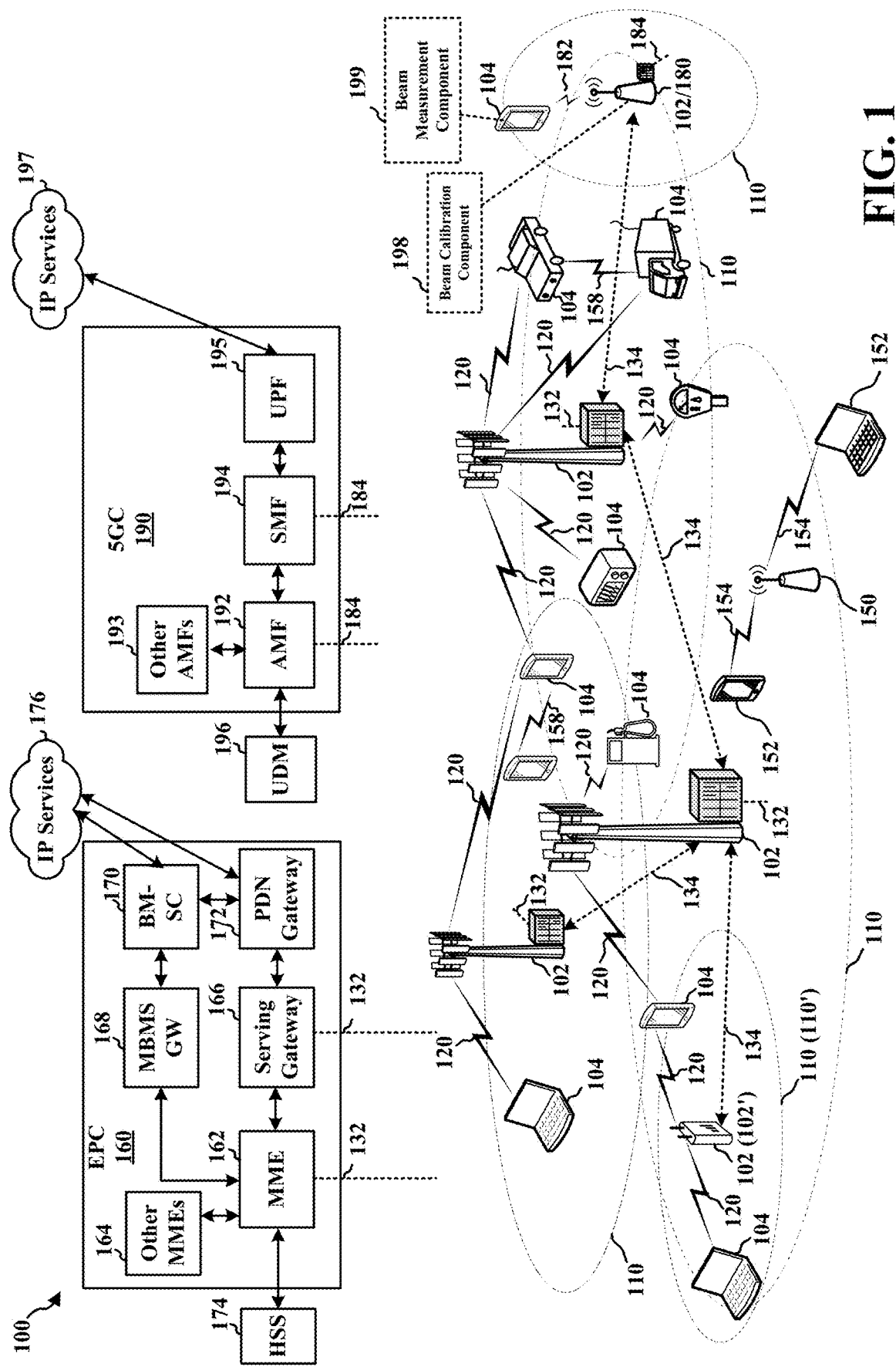
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in mmW frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may comprise a beam calibration component 198 configured to determine a set of silent symbols for beam calibration measurements by a UE, e.g., 104 for full duplex communication. The base station may be configured to transmit, to the UE, an indication of the set of silent symbols for the beam calibration measurements by the UE. The base station may be configured to refrain from transmitting during the set of silent symbols. The base station 180 may determine the set of silent symbols in connection with other base stations. UE 104 may comprise a beam measurement component 199 configured to receive an indication of a set of silent symbols for a beam calibration measurement by the UE for full duplex communication with a base station, e.g., 180. The UE 104 may be configured to perform beam calibration measurements for the beam candidates. When performing the beam calibration measurements, the UE 104 may be configured to transmit a sequence of symbols using a transmission beam from a set of transmission beams. In addition, the UE 104 may be further configured to receive the sequence of symbols using a reception beam from a set of reception beams. The UE 104 may be configured to determine a calibration adjustment between the beam candidates for full duplex communications based on the sequence of symbols received at the UE. The UE 104 may be configured to use the calibration adjustment to perform full duplex communication with the base station 180 using the beam candidates.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
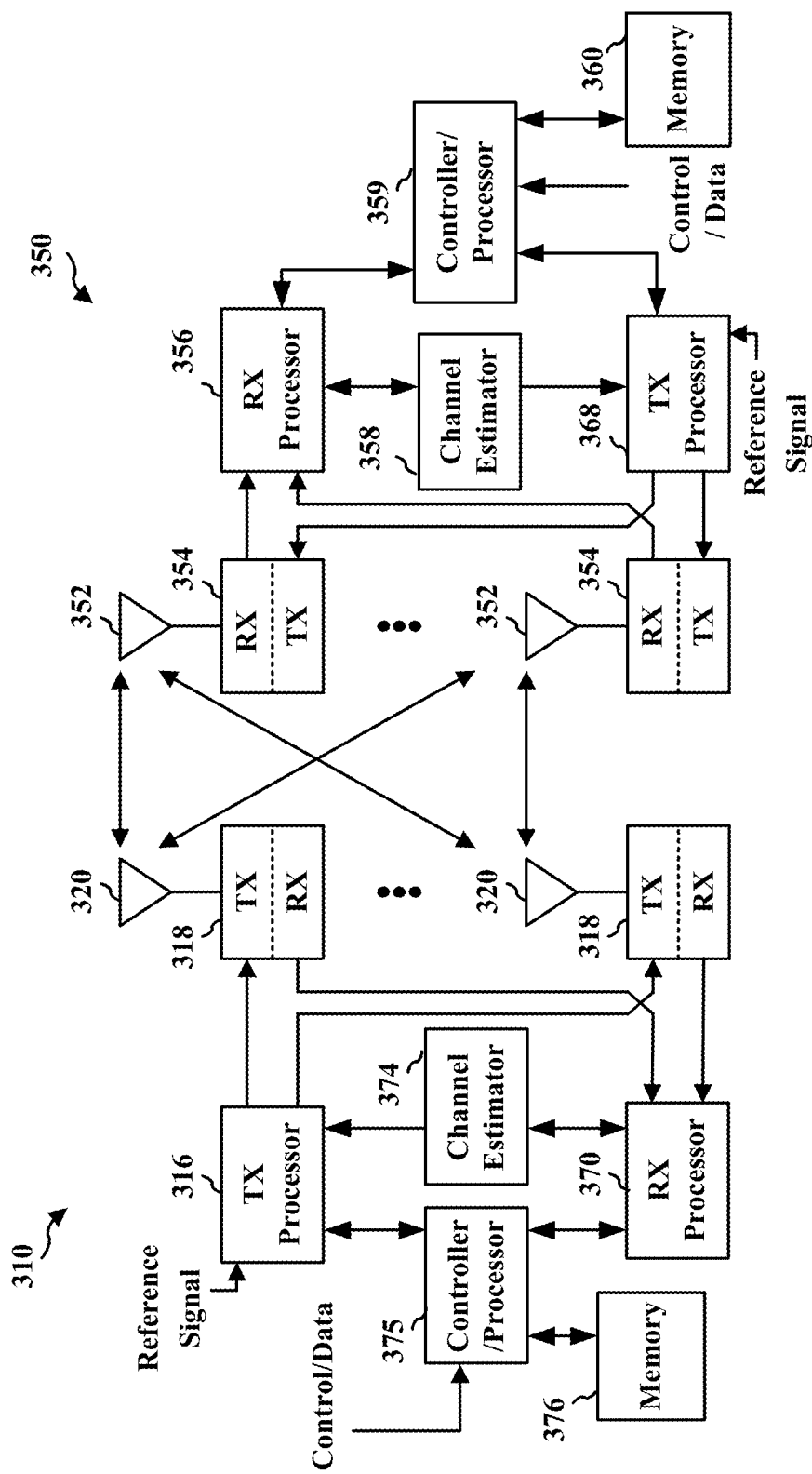
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
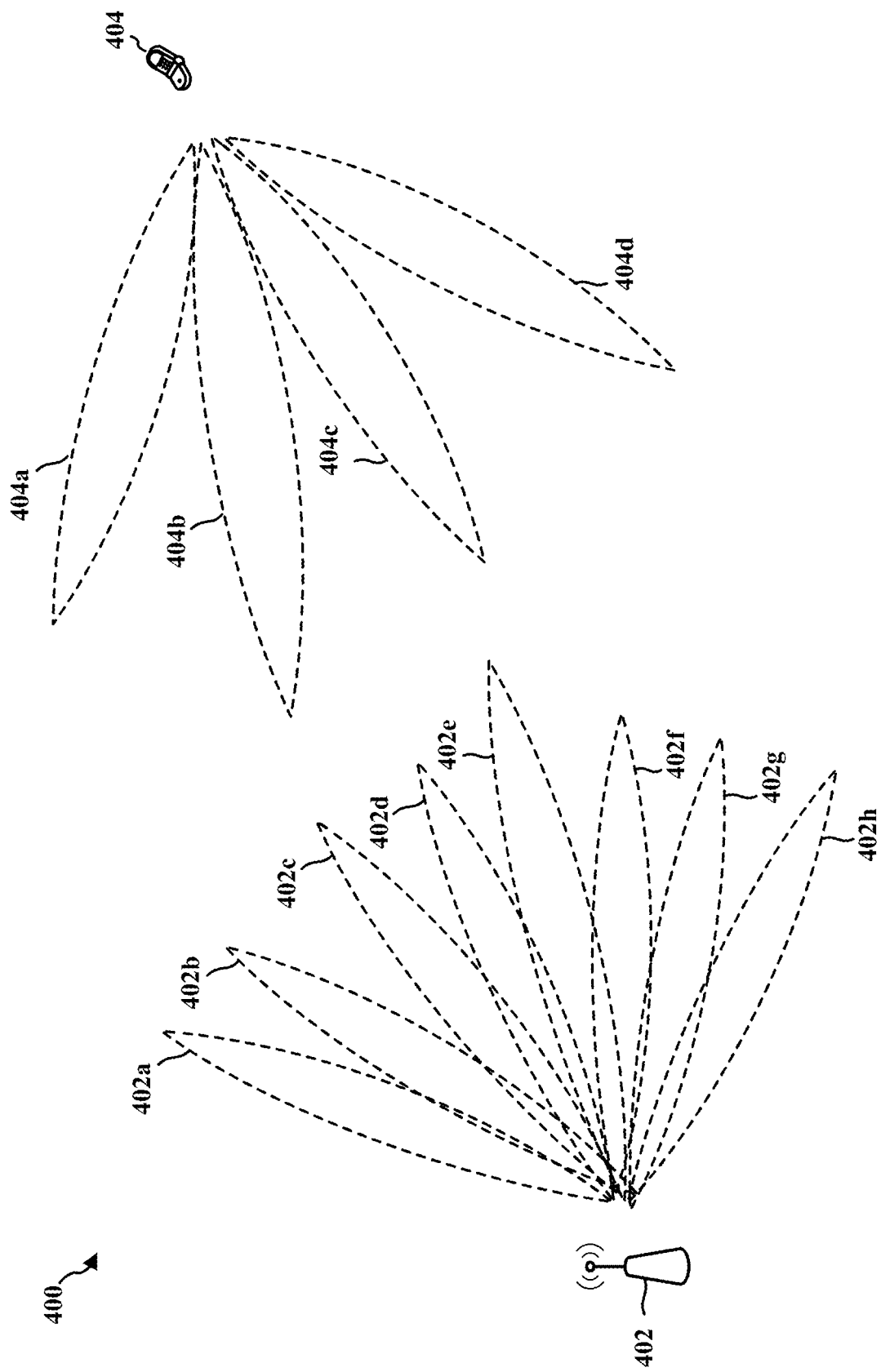
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Figure 5:
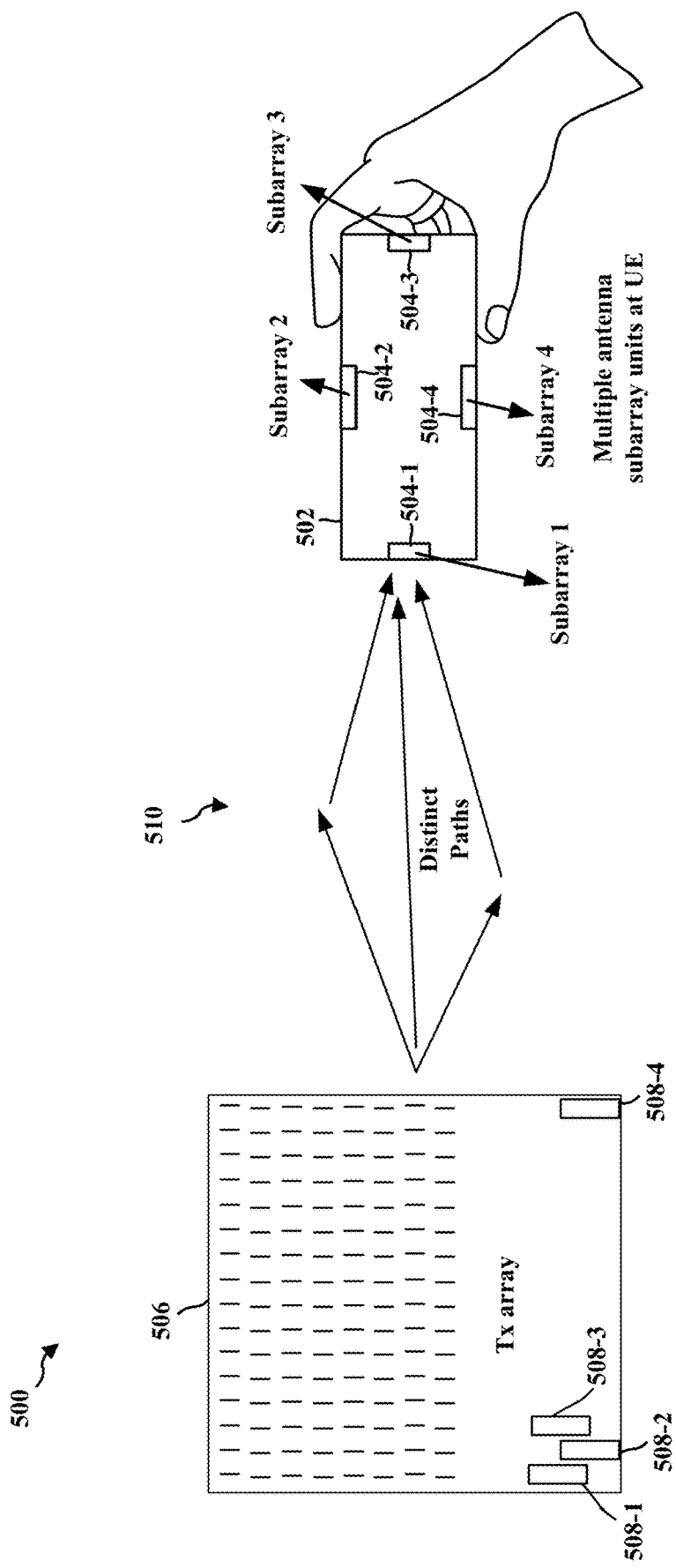
FIG. 5 illustrates a wireless communication system in accordance with certain aspects of the disclosure.

FIG. 5 illustrates a wireless communication system 500 in accordance with certain aspects of the present disclosure. The wireless communication system 500 can include a UE 502 and a base station 506. The base station can correspond to e.g., base station 102, 180, 310, 402, 506, 704, 904, 906, 1450, apparatus 1102/1102'. The UE may correspond to, e.g., UE 104, 350, 404, 502, 702, 902, 1150, apparatus 1402/1402'.

In wireless communications, such as mmW systems, multiple antennas may be used at the base station and UE to send different notification and paging signals to each other in order to facilitate communication. The multiple antennas can each have multiple antenna subarrays, such that transmission can occur on one subarray and reception can occur on another subarray. Full duplex transmission using multiple antenna subarrays, e.g., such as in mmW frequencies, has unique requirements and challenges for calibration of the beams used for transmission and reception.

As illustrated, a UE 502 may comprise one or more antenna subarrays, and the base station 506 may also comprise one or more antenna subarrays. The antenna subarrays may be used for beamformed communication, as described in connection with FIG. 4. In the example of FIG. 5, the UE 502 comprises four subarrays, 504-1, 504-2, 504-3, and 504-4, while the base station 506 may also comprise four subarrays 508-1, 508-2, 508-3, and 508-4. The UE 502 and base station 506 can comprise many different subarrays and the disclosure is not intended to be limited to the number of subarrays disclosed in the example of FIG. 5. The UE 502 and base station 506 may communicate with each other using one or more distinct paths 510. Multiple antennas can be used between the base station and the UE in mmW systems. Beamforming from multiple antennas can be utilized to improve and/or enhance the link budget. In order for the improving the link budget, the multiple beams need to be calibrated for full duplex communication.

Figure 6:
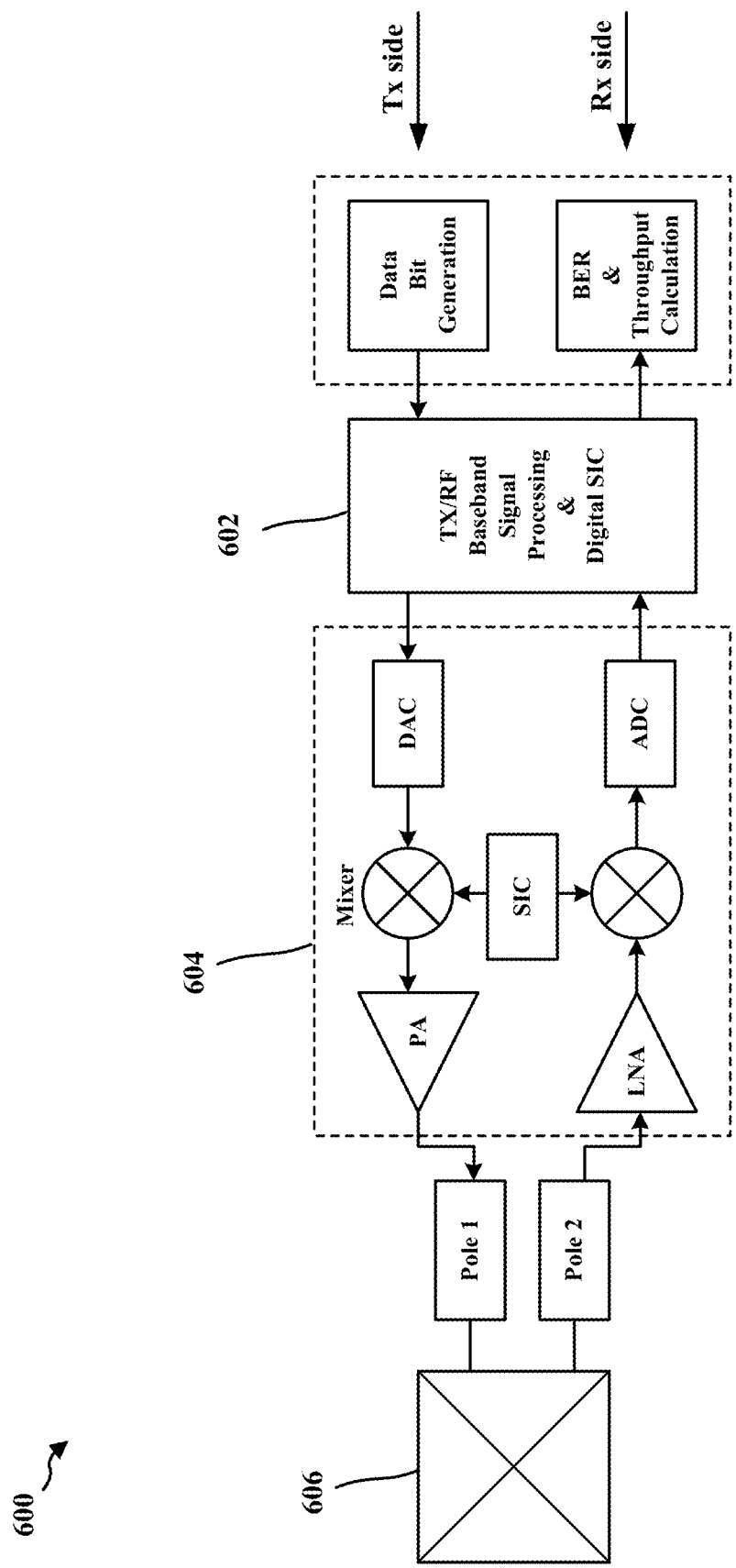
FIG. 6 illustrates beamforming circuitry in accordance with certain aspects of the disclosure.

FIG. 6 illustrates beamforming circuitry 600 in accordance with certain aspects of the disclosure. The circuitry 600 is an example of circuitry that may be utilized at a base station or UE for half duplex and/or full duplex communication. The circuitry 600 may comprise a baseband component 602, a transmit-receive (TR) component 604, and an antenna 606. The baseband component 602, TR component 604, and/or the antenna 606 may include one or more components described herein that are not illustrated in FIG. 6, and/or may exclude one or more illustrated components.

The TR module 604 can comprise different components for a transmission chain and a reception chain. For example, a transmission chain comprised in the TR module 604 may comprise a power amplifier (PA), a digital-to-analog converter (DAC), a mixer, and different filters. A receiving chain in the TR module 604 may comprise a low noise amplifier (LNA), an analog-to-digital converter (ADC), a mixer, and different filters. For transmission, data bits may be generated and provided to baseband component 602 that performs RF baseband signal processing for the bits. The processed signal is provided to the TR module, which in turn provides the signal to at least one antenna for transmission. Communication that is received by the antenna is processed through the receive chain at the TR module before processing by the baseband component 602. The baseband component 602 may also perform interference cancellation. The signal may then be provided to additional components for BER and throughput calculations.

In half duplex systems, the transmit side and the receive side of the TR module can be separated by a switch so that only one part of the circuitry is at any given time, e.g., the transmission chain or receive chain. The switch either connects the downlink circuitry or the uplink circuitry, which determines whether the TR module is configured to transmit or configured to receive. In some examples, the switch can be a duplexer. In full duplex systems, the transmit side and the receive side of the TR module function simultaneously and can be separated by a self-interference cancellation (SIC) circuitry, instead of the switch used in half duplex circuitry. The SIC separates the transmit side and the receive side of the TR module to enable full duplex communication.

In half duplex systems, there may be beam correspondence between the transmit and receive chains, or there may be no beam correspondence. If there is beam correspondence, the downlink receive beams can be reused as uplink transmit beams to perform a calibration process, where the calibration adjusts for circuit mismatches. If there is no beam correspondence, a different beam scanning process can be used for setting up the uplink transmit beams. As one example, Uplink hierarchical beam scanning may be performed using SRS. Such hierarchical beam scanning may be referred to as U-1/2/3, e.g., in 5G NR.

However, due to simultaneous transmission and reception, full duplex systems cannot be managed with offline calibration in the same manner that half duplex systems are calibrated. Offline calibration for half duplex systems assumes that the same set of antennas are used to transmit and receive, which is not possible for full duplex communication. In full duplex systems, a first antenna subarray, or a first set of antennas, or a first antenna module can be used to transmit, at the same time that a second antenna subarray, or a second set of antennas, or a second antenna module can be used to receive. The set of antenna subarrays, antennas, or antenna modules used to transmit and the set used to receive can be dynamic.

Thus, in full duplex communication, the number of possible subarray pairs for calibration increases exponentially with the number of antennas at the UE end. For example, for a single RF chain at the UE end and with the combination of antennas being limited to within a single collocated subarray of antennas, the number of possible subarray pairs to transmit and receive is Ns, where $$N_s = \left(\sum_{i=1}^{P}(2^{M_i} - 1)\right)^2$$

with P being the number of collocated subarrays at the UE end, and with $M_i$ antennas available in the i-th collocated subarray. In an example, where $M_i=2$ for all i, and P=4, $N_s$=144. In another example, with $M_i=4$ for all i, and P=4, $N_s$=3600. This example illustrates the increase in the number of possible subarray pairs.

The number of possible subarray groups could be even more when additional RF chains are involved, or when antenna combinations may be made across non-collocated subarrays. Checking all of these subarray pairs/groupings for calibration in an offline mode is time consuming and complicated. Additional issues can arise in practice that could further complicate offline calibration, such as temperature sensitivity of the power amplifiers, low noise amplifiers, phase shifters, failure of some of the components during operation, etc. As such, full duplex systems may require online calibration for beam management.

Figure 7:
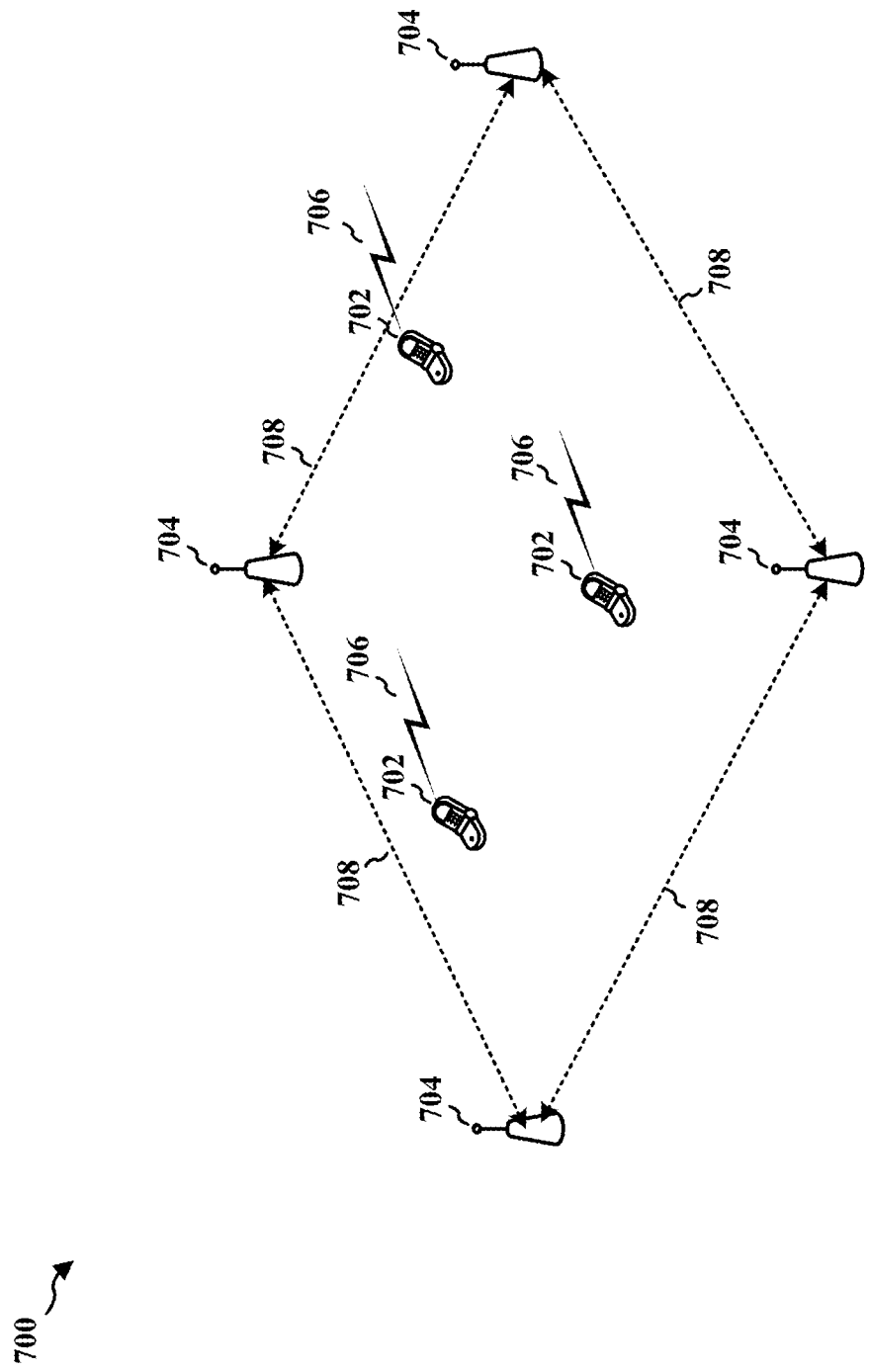
FIG. 7 illustrates a wireless communication system in accordance with certain aspects of the disclosure.

FIG. 7 illustrates a wireless communication system 700 in accordance with certain aspects of the disclosure. The wireless communication system 700 can comprise one or more UEs 702 and one or more base stations 704. The one or more UEs 702 and the one or more base stations 704 can be configured to communicate in full duplex communication. In order for the one or more UEs 702 and the one or more base stations 704 to communication in full duplex communication, the transmit and receive subarrays need to be calibrated. As discussed above, offline calibration for a full duplex system may not be feasible due to the numerous subarray pairs/groupings for a UE and base station. Thus, online beamforming calibration can be utilized to calibrate for circuitry mismatches between a reception beam and a transmission beam.

In some configurations, UE 702 can be configured to determine candidate subarrays, e.g., candidate serving beam pairs and base station/Transmission Reception Point (TRP) 704 for uplink and downlink communication. UE 702 can be configured to report the beam candidate choices to corresponding base station(s)/TRP(s) 704. UE 702 can indicate to the base station 704 to use a first beam to transmit, and can further indicate to the base station to use a second beam to receive.

In some examples, the determination of the beam candidates can be done in an autonomous manner by the UE 702. In such examples, the UE 702 can use beam selection procedures, e.g., P-1/2/3 in NR communication, etc., to make a first determination of possible beam candidate choices. From these choices, the UE may further narrow selection of the beam candidates based on any of a number of different options, such as the UE's full duplex capability, paths/clusters in the channel, payloads for uplink/downlink, tolerable latencies, transmit versus receive power consumption, geometry/inter-site distances, etc.

In some examples, the base station 704 can be configured to assist in the determination of the beam candidates. In an example, the base station may determine the beam candidates and provide an indication of the beam candidates to the UE. In such examples, the base station 704 can specifically configure the transmit and receive beam pairs for use at the UE side. The base station 704 can make the determination based on prior reported measurements by the UE 702, the full duplex capability of the UE, other UE reports, etc. The base station 704 may collaborate with the UE 702 to determine the beam pair to use for full duplex communication, such that the determination may be a network assisted procedure.

Thus, the candidate beam pairings may either be determined autonomously by the UE 702 or based on an indication from the base station 704.

The one or more base stations 704 may assist the UE 702 in performing calibration for full duplex communication by reserving a set of silent symbols for the UE 702 to perform a calibration process. The base station may identify or otherwise provide the set of silent symbols, from a pool of sequences of silent symbols or sets of silent symbols, and may refrain from transmitting during the identified silent symbols. The one or more base stations 704 may coordinate with each other and allocate to the UE(s) 702 one or more contiguous set of silent symbols. In other examples, a single base station may provide the set of silent symbols for the UE. The symbols are referred to as "silent" due to the base station(s) 704 refraining from transmitting during the symbols. In some examples, the coordination between the one or more base stations 704 can be based on an agreed higher layer protocol. In some examples, one or more of the base stations 704 can be configured to transmit a signal 708, based on the higher layer protocol, to other of the one or more base stations 704 which enables the one or more base stations to coordinate the symbols to be reserved as silent symbols for UE calibration. In some examples, the set of silent symbols may be provided in common to multiple UEs 702 that are being served by the base station(s). In some examples, the set of silent symbols may be identified/reserved in a UE specific manner.

While the base station(s) 704 refrain from transmitting during the set of silent symbols, UE 702 transmits a known sequence of symbols 706 with the transmit subarray for the candidate transmission serving beam. The UE 702 may set the respective transmit subarray to a certain phase shift setting. The UE 702 may use the receive subarray for the candidate reception beam to receive the known sequence of symbols 706 that the UE's transmit subarray transmitted during the set of silent symbols. In some examples, the sequence of symbols 706 can be UE specific in order to avoid picking up interference from other UEs that may concurrently perform a calibration procedure. In such examples, the sequence of symbols 706 can be orthogonalized to ensure less interference across the UEs. In other examples, the sequence of symbols 706 can be base station specific. For example, the sequence of symbols 706 can be specified by the base station, such that the base station indicates to the UE the sequence of symbols to use. The sequence of symbols can be selected by the base station from a pool of sequences, such as but not limited to, pseudo-random Walsh/Zadoff Chu and/or other orthogonal codes/sequences.

Based on the received sequence of symbols transmitted during the silent symbols, each of the one or more UEs 702 can perform a cross correlation between the received symbols and the transmitted symbols, based in part on the known phase shift setting set at the transmit subarrays and the phase shift received at the receive subarray, to determine the calibration needed for the simultaneous use of the transmit and receive subarrays with the candidate beam pairs. In some examples, the UE may determine an amplitude adjustment and/or phase adjustment that needs to be applied to the receive subarray relative to the transmit subarray. The UE may then apply the determined calibration adjustments for transmission and reception in full duplex operation with the base station(s) 704.

In some examples, the power used by the transmit subarray of the UE 702 for the calibration process can be configured by a base station 704. In other examples, the UE may autonomously determine the power to be used by the transmit subarray for the calibration process. The results of the calibration measurements can be used by the respective UEs 702 for adjusting the transmit subarray with respect to the receive subarray. In addition, the results of the UE may report the calibration measurements to the base station(s) 704. In some examples, subset(s) of transmit and receive beams can be reported to the base station 704 based on a threshold with respect to the calibration measurements. In some examples, the base station(s) 704 can select the candidate full duplex beams from the UE report(s).

Figure 8:
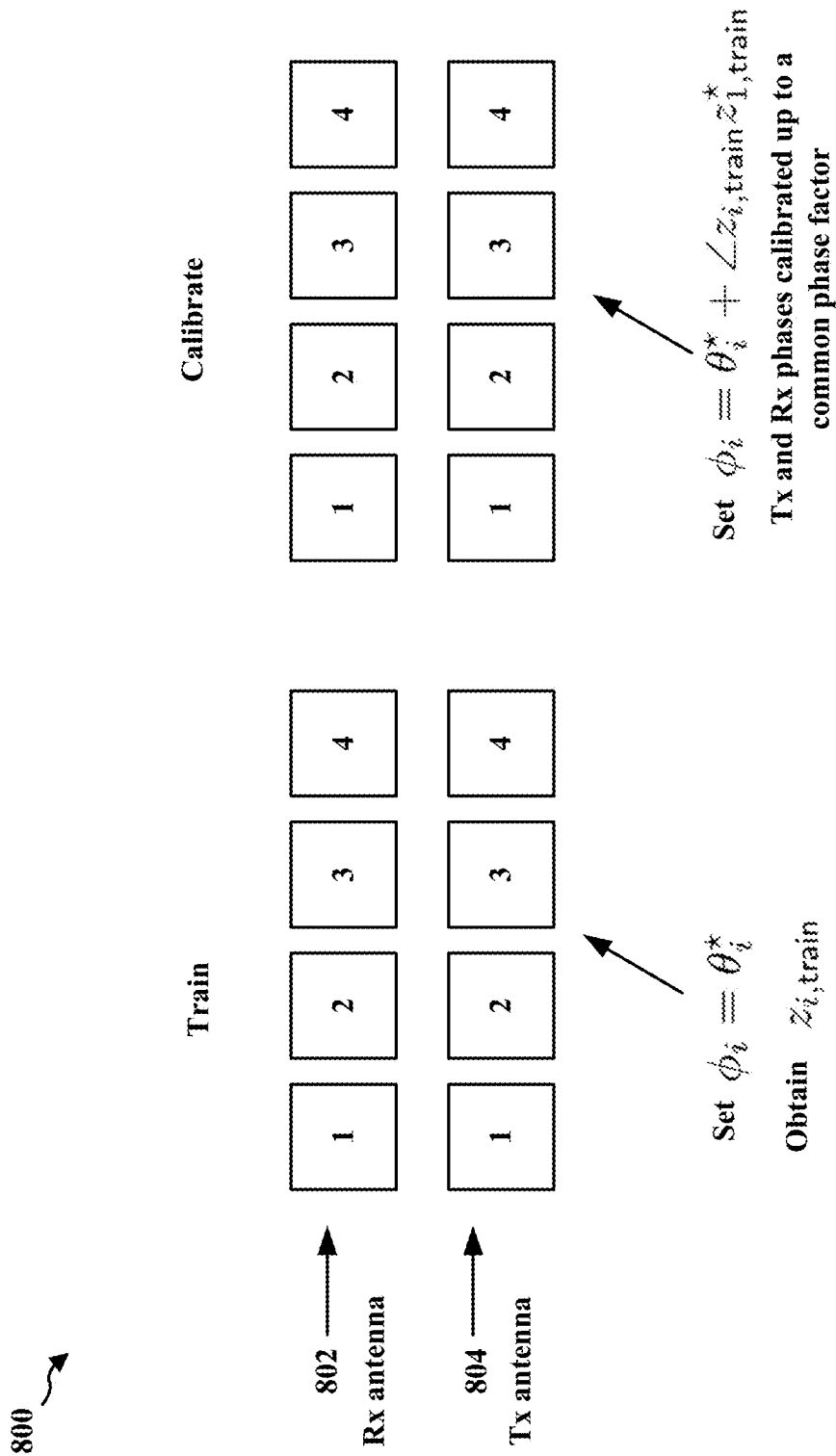
FIG. 8 illustrates a set of silent symbols in accordance with certain aspects of the disclosure.

FIG. 8 illustrates an example 800 of an online calibration process. In the example 800, a system may comprise four receive antennas 802 and four transmit antennas 804. The transmit and receive subarrays have $N_r=4$ antennas each, $N_r$ corresponding to a number of antennas. As such, the example calibration process may use $2*N_r=8$ contiguous silent symbols to calibrate the four antennas. The online calibration process can comprise a training portion and a calibration portion. Thus, a first set of the silent symbols may be used to first train the antennas, and then a second set of the silent symbols may be used to calibrate the antennas. To train the antennas, the UE's transmit subarrays may each transmit a known signal, such that the known signal is transmitted by a respective one of the 4 transmit subarrays in one of the training symbols. For example, in a first silent symbol, a first set of one or more antennas may transmit the known signal. In a second silent symbol, a second set of one or more antennas may transmit the known signal. In a third silent symbol, a third set of one or more antennas may transmit the known signal, and in a fourth silent symbol, a fourth set of one or more antennas may transmit the known signal. At the same time, the UE may use the candidate reception antennas to receive the known signal. The training symbols may be transmitted during silent symbols reserved by the base station so that the UE is able to make accurate determinations about necessary calibrations between the transmission and reception antennas. Each of the sets of one or more antennas can be set to a certain phase shift setting (e.g., $\phi_i=\theta_i^*$). In some examples, each of the sets of one or more antennas can be set to the same phase shift setting. In other examples, each of the sets of one or more antennas can be set to a different phase shift setting. In certain aspects, the sets of one or more antennas can be set to the same or different phase shift setting. The corresponding set of one or more receive antennas receives the transmission of the first dummy symbol transmitted by the corresponding set of one or more antennas. The UE, based on the received signal and the phase shift setting, determines a training factor for each subarray (e.g., $z_{i,train}$). From here, the UE may proceed to the calibration portion.

With a second set of 4 silent symbols, the UE may adjust a phase shift setting for each of the transmit arrays to the phase shift setting based on the measurements performed during the training portion (e.g., the phase may be adjusted based on $\phi_i=\theta_i^*+\angle z_{i,train}z_{1,train}^*$). For example, for the second set of one or more antennas, the phase shift setting would be set to the phase shift setting for the second set of one or more antennas set for the training portion plus the phase difference of what was received by the second set of one or more receive antenna relative to the what was transmitted by the second set of one or more antennas during the training portion and with this phase difference relatively compared with respect to the first antenna pair. Once the phase shift setting is set for each of the sets of one or more antennas for the calibration portion, each of the sets of one or more antennas transmit the second known signal and receives the second known signal at the corresponding respective set of one or more receive antennas. If the respective set of one or more receive antennas receive the known signal with the correct phase shift based on the adjustment at the respective sets of one or more antennas for the calibration portion, then the sets of one or more transmit and receive antennas may be considered calibrated for operation in full duplex communication.

As an example of possible calculation to be determined in connection with full duplex calibration, the UE antenna reception at the $i^{th}$ antenna, with noise-free reception at the $i^{th}$ antenna at the UE, may be defined by $$y_{R,i} = \alpha_i \cdot e^{j(\theta_i + \theta_{h,i} + \theta_{M_R,i} + \theta_{R,i})}$$

where $\theta_{h,i}$=phase of channel impulse response at $i^{th}$ antenna in receive mode,
$\theta_{M_R,i}$=phase of mixer in the $i^{th}$ receive path
$\theta_{R,i}$=phase contribution of all other RF components in the $i^{th}$ path (LNAs, couplers, filters, etc.)
$\theta_i$=phase to which phase shifter at $i^{th}$ antenna in Rx mode is set
$\alpha_i$=gain of all RF components (including mixer), channel and phase shifter in the $i^{th}$ $R_x$ path
$\Theta_i$=set of phase shifter quantizations possible at $i^{th}$ antenna
$j=\sqrt{-1}$ is used to generate a complex quantity
A beamformer at UE a in receive mode may be represented by:

$$f_R = \frac{1}{\sqrt{N_r}} \cdot \begin{bmatrix} e^{j\theta_1^*} \\ \vdots \\ e^{j\theta_{N_r}^*} \end{bmatrix}$$

If $\theta_i^*$ is the phase for the $i^{th}$ antenna from the known sequence of symbols (quantized to be within $\Theta_i$), we use $\theta_i=\theta_i^*$.

For a UE antenna transmission at the $i^{th}$ antenna, with noise-free transmission at the $i^{th}$ antenna at the UE, the transmission may be defined by $$y_{T,i} = \beta_i \cdot e^{j(\phi_i + \theta_{h,i} + \theta_{M_T,i} + \theta_{T,i})}$$

where $\theta_{h,i}$=phase of channel impulse response at $i^{th}$ antenna in transmit mode (channel reciprocity/correspondence can be the same gain as in receive mode)
$\theta_{M_T,i}$=phase of mixer in the $i^{th}$ transmit path
$\theta_{T,i}$=phase of all other RF components in the $i^{th}$ path (power amplifiers, couplers, filters, etc.)
$\phi_i$=phase to which phase shifter at $i^{th}$ antenna in transmit mode is set
$\beta_i$=gain of all RF components (including mixer), channel and phase shifter in the $i^{th}$ transmit path
A beamformer at a UE in transmit mode may be represented by $f_T$:

$$f_T = \frac{1}{\sqrt{N_r}} \cdot \begin{bmatrix} e^{j\phi_1} \\ \vdots \\ e^{j\phi_{N_r}} \end{bmatrix}$$

In general, $\theta_{T,i} \neq \theta_{R,i}$ and $\theta_{M_T,i} \neq \theta_{M_R,i}$ (different sets of RF components).

For any choice of $\theta_i^*$ and $\phi_i$ note that $z_i \triangleq y_{R,i} y_{T,i}^*$ is given as:

$$z_i = y_{R,i} y_{T,i}^* =$$

$$\alpha_i \beta_i \cdot e^{j(\theta_i^* - \phi_i + \theta_{M_R,i} - \theta_{M_T,i} + \theta_{R,i} - \theta_{T,i})} = \alpha_i \beta_i \cdot e^{j(\theta_i^* - \phi_i + \Delta\theta M_{RT,i} + \Delta\theta_{RT,i})}$$

where $\Delta\theta M_{RT,i} = \theta_{M_R,i} - \theta_{M_T,i}$
$\Delta\theta_{RT,i} = \theta_{R,i} - \theta_{T,i}$ For the training phase:

The UE may set $\phi_i = \theta_i^*$ at each UE antenna in Tx mode and may compute $z_i$,train.

For the signaling phase (or the calibration phase):

The beamformer weights in transmit mode can be set as:

$$f_T = \frac{1}{\sqrt{N_r}} \cdot \begin{bmatrix} e^{j\phi_1} \\ \vdots \\ e^{j\phi_{N_r}} \end{bmatrix}$$

where $\phi_i = \theta_i^* + \angle z_{i,train} z_{1,train}^*$

Using the above in an example with two antennas will provide:

UE antenna 1 can have $$y_{T,1} = \beta_1 \cdot e^{j(\phi_1 + \theta_{h,1} + \theta_{M_T,1} + \theta_{T,1})}$$
$$= \beta_1 \cdot e^{j(\theta_1^* + \theta_{h,1} + \theta_{M_T,1} + \theta_{T,1})}$$
$$= \beta_1 \cdot e^{j(\theta_1^* + \theta_{h,1} + \theta_{M_R,1} + \theta_{R,1})} \cdot e^{-j(\Delta\theta M_{RT,1} + \Delta\theta_{RT,1})}$$

Similarly, UE antenna 2 can have $$y_{T,2} = \beta_2 \cdot e^{j(\phi_2 + \theta_{h,2} + \theta_{M_T,2} + \theta_{T,2})}$$
$$= \beta_2 \cdot e^{j(\theta_2^* + \theta_{h,2} + \theta_{M_R,2} + \theta_{R,2})} \cdot e^{-j(\Delta\theta M_{RT,1} + \Delta\theta_{RT,1})}$$

In other words, barring a common phase factor at all the UE antennas, the phases in the transmit mode are the same as those in the receive mode (which can be optimized and/or synchronized for phase coherence, subject to phase shifter constraints). The $z_{i,train}$ can comprise the phase difference between the transmit and receive paths at the $i^{th}$ antenna. By using $\angle z_{i,train} z_{1,train}^*$, it is possible to benchmark the phase difference relative to the first UE antenna without the need for explicit transmit side calibration. The UE may use the $z_{i,train}$ information to apply an adjustment between the transmission and reception paths in order to calibrate the UE for full duplex communication.

Figure 9:
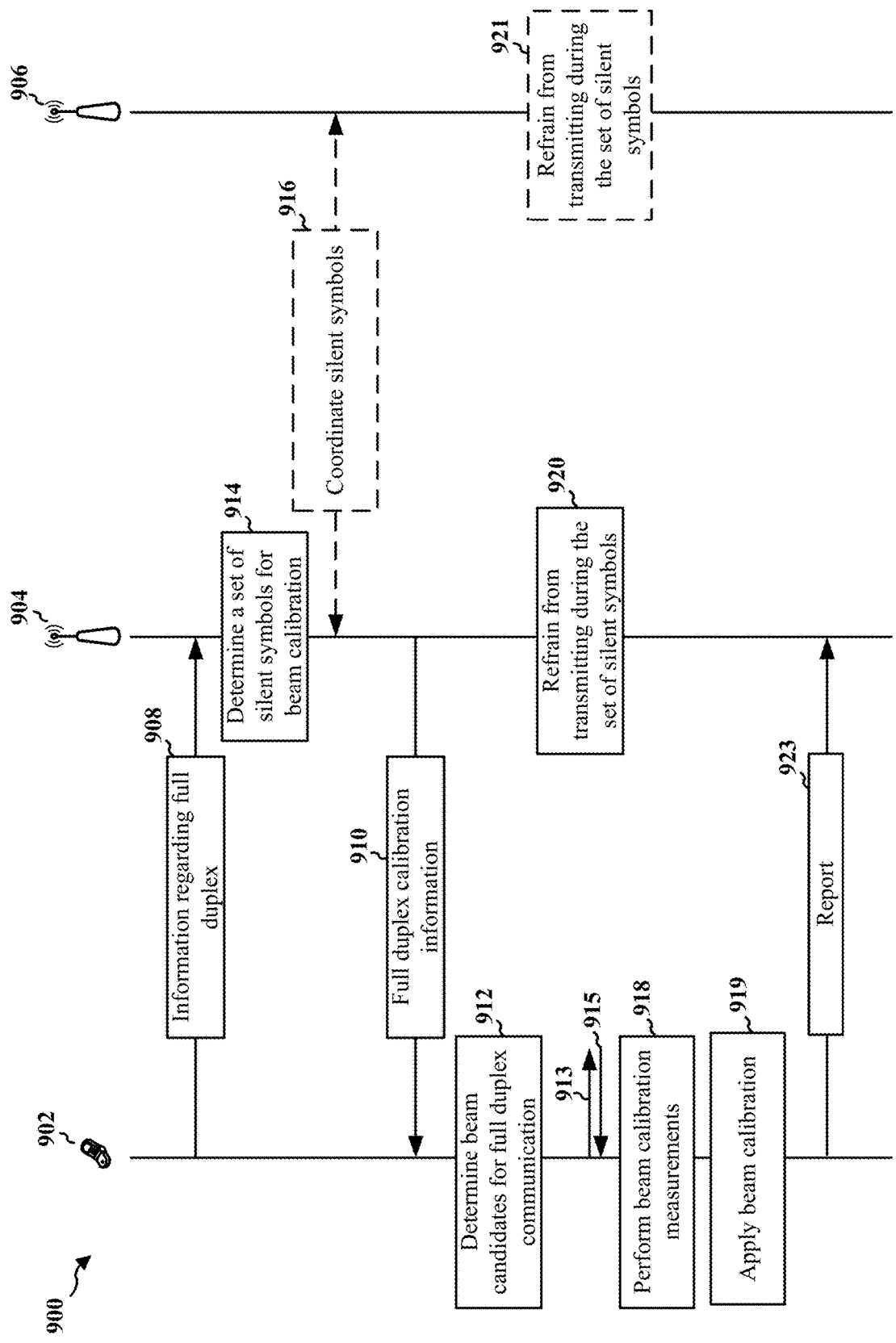
FIG. 9 illustrates an example of communication flow between a base station and a UE.

FIG. 9 illustrates an example 900 of communication flow between a base station and a UE. In FIG. 9, UE 902 may be configured to perform the online calibration technique in accordance with the system 700 of FIG. 7, and the example 800 of the calibration process of FIG. 8. The base station can correspond to e.g., base station 102, 180, 310, 402, 506, 704, 904, 906, 1450, apparatus 1102/1102'. The UE may correspond to, e.g., UE 104, 350, 404, 502, 702, 902, 1150, apparatus 1402/1402'.

At 908, the UE 902 can send information to the base station 904 to regarding a calibration mode. The UE may indicate a need to perform calibration, a capability to perform full duplex communication, a candidate beam pair, etc. At 910, the base station 904 can respond to the UE 902 with information regarding full duplex. The information may include an indication of a set of silent symbols during which the base station will refrain from transmission so that the UE can perform calibration, an indication of a transmission power for calibration, an indication of a candidate beam pair, a sequence for the UE to use in performing calibration, etc.

At 912, the UE 902 can be configured to determine the beam candidates that are to be calibrated for full duplex communication. The UE may determine the beam candidates autonomously or based on information received from the base station 910. In some examples, the base station 904 can be configured to determine the beam candidates that are to be calibrated for full duplex communication. To determine the beam candidates, the UE can be configured to select a pair of an uplink antenna subarray and a downlink antenna subarray for the full duplex communication. Furthermore, to determine the beam candidates, the UE can be further configured to select a beam pair for the full duplex communication, such that the beam pair can comprise a transmission serving beam selected for use with the uplink antenna subarray and a reception serving beam selected for use with the downlink antenna sub array.

The base station 904, at 914, can determine a set of silent symbols for beam calibration measurements by the UE. In some examples, the set of silent symbols can comprise at least one symbol. In some examples, the set of silent symbols can comprise multiple contiguous symbols. The set of silent symbols can be selected by the base station in common for multiple UEs served by the base station or for a single UE. In some examples, a first number of the set of silent symbols can be at least twice as a second number of antenna subarrays for which the UE performs the beam calibration measurements. The set of silent symbols can be any length and is not intended to be limited to the examples disclosed herein.

In some examples, the base station 904, at 916, can provide a signal indication to one or more base stations (e.g., base station 906) providing instructions to refrain from transmitting during the calibration process or otherwise coordinating the set of silent symbols. At 920, the base station 904 is configured to refrain from transmitting during the set of silent symbols. In some examples, the one or more base stations 906 also refrain from transmitting during the set of silent symbols, at 921.

At 918, the UE 902 can be configured to perform the beam calibration measurements. In some examples, to perform the beam calibration measurements for the beam candidates, the UE 902 can transmit a sequence of symbols, at 913, using a transmission beam from a set of transmission beams. The UE can then receive, at 915 the sequence of symbols sent using a reception beam from a set of reception beams. Although 913 and 915 are illustrated using separate lines, the UE will simultaneously transmit and receive the sequence of symbols. The UE may transmit and receive the sequence of symbols during a set of contiguous symbols in which the one or more base stations do not transmit, e.g., silent symbols. The UE can then determine a calibration adjustment between the beam candidates based on the sequence of symbols received by the UE. The calibration adjustment can comprise a phase adjustment based on a correlation of a transmit phase and a receive phase across a collection of antennas for the beam candidates. The calibration adjustment can further comprise an amplitude adjustment based on a correlation of a transmit amplitude and a receive amplitude across a collection of antennas for the beam candidates.

At 923, the UE can send information based on the calibration determinations to the base stations. This may indicate that the UE has reached the end of the calibration mode, where the UE uses the calibration adjustment to perform the full duplex communication with the base station using the beam candidates. The UE may report calibration information and/or measurement information. The UE may provide information regarding beam pairs based on the calibration measurements.

Figure 10:
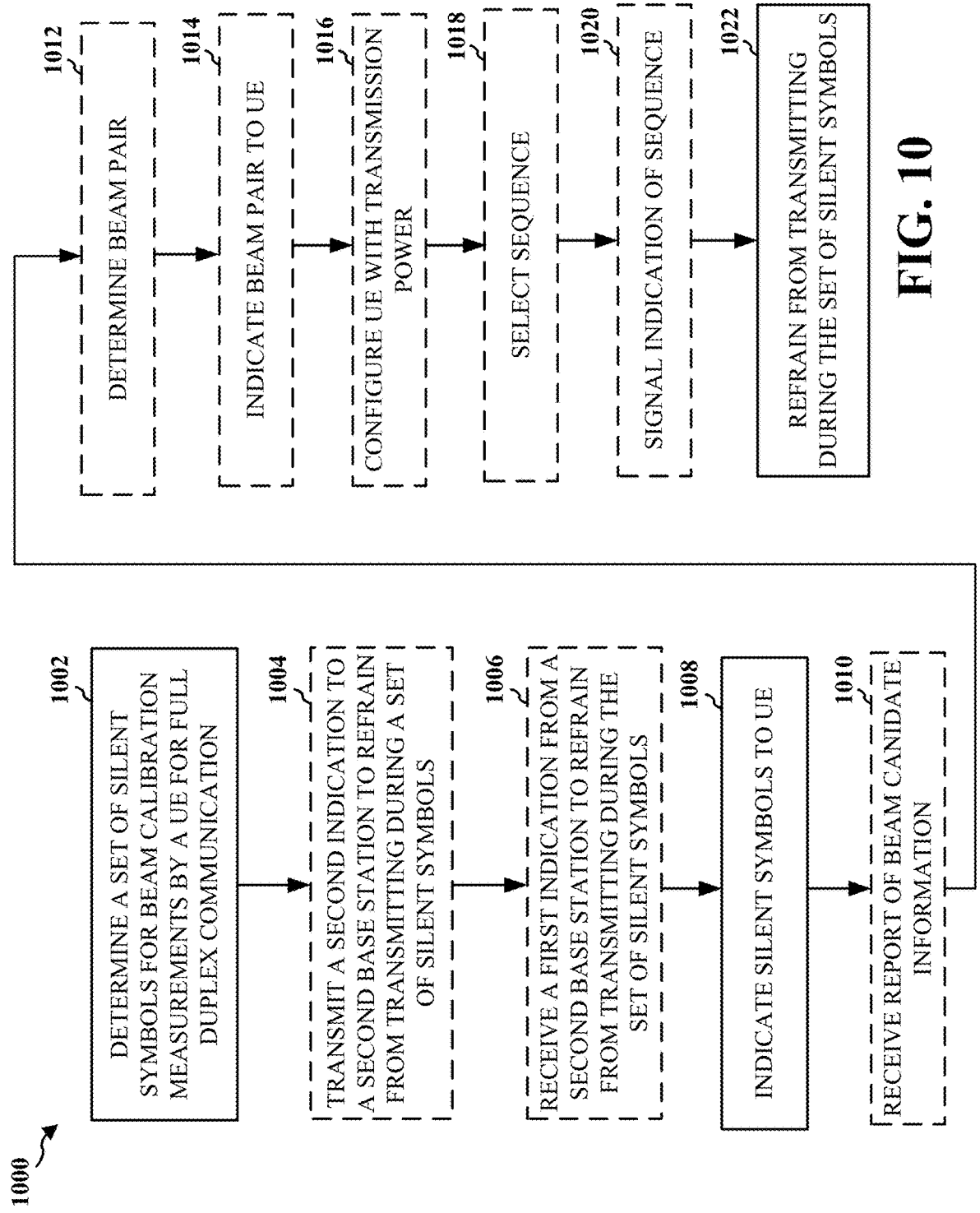
FIG. 10 is a flowchart of a method of wireless communication.

FIG. 10 is a flowchart 1000 of a method of wireless communication. The method may be performed by a base station or a component of a base station (e.g., base station 102, 180, 310, 402, 506, 704, 904, 906, 1450; the apparatus 1102/1102'; the processing system 1214, which may include the memory 376 and which may be the entire base station 310 or a component of the base station 310, such as the TX processor 316, the RX processor 370, and/or the controller/processor 375) communicating with a UE (e.g., UE 104, 350, 404, 502, 702, 902, 1150; the apparatus 1402/1402'; the processing system 1514, which may include memory 360 and which may be the entire UE 350 or a component of the UE 350, such as TX processor 368, the RX processor 356, and/or the controller/processor 359). Optional aspects are illustrated with a dashed line. The method may allow the base station to assist in the determination of the beam candidates for full duplex communication with the UE.

At 1002, the base station may determine a set of silent symbols for beam calibration measurements by a UE for full duplex communication. For example, silent symbols component 1106 in apparatus 1102 may determine the set of silent symbols. In some examples, the set of silent symbols can comprise at least one symbol. In some examples, the set of silent symbols can comprise multiple contiguous symbols. In some examples, the set of silent symbols can be selected by the base station in common for multiple UEs served by the base station. In some examples, the set of silent symbols can be selected by the base station for a single UE. In some examples, the set of silent symbols can be selected by the base station for multiple UEs. In one example, a first number of the set of silent symbols can be at least twice as a second number of antenna subarrays for which the UE performs the beam calibration measurements, e.g., as in the example described in connection with FIG. 8. As illustrated at 1008, the base station indicates the set of silent symbols for beam calibration measurements to the UE. For example, transmission component 1108 in apparatus 1102 may transmit the set of silent symbols to the UE. The base station can be configured to indicate, to the UE, the beginning of the set of silent symbols and the duration of the set of silent symbols. The base station can provide such indication to the UE using at least one of a downlink control information (DCI), a medium access control-control element (MAC-CE), or a radio resource control (RRC) signaling.

At 1004, the base station may transmit a second indication to a second base station to refrain from transmitting during a set of silent symbols. For example, indication component 1110 of apparatus 1102 may transmit the second indication to the second base station. At 1006, the base station may receive a first indication from a second base station to refrain from transmitting during the set of silent symbols. For example, indication component 1110 of apparatus 1102 may receive the first indication from the second base station. Thus, base stations may coordinate to provide silent symbol(s) for UE(s) to perform calibration for full duplex communication. The coordination may be for symbols that are UE specific or for multiple UEs served by a base station.

In some examples, the base station can be configure to receive a report of beam candidate from the UE, at 1010. For example, report component 1116 of apparatus 1102 may receive the report of beam candidates from the UE. The base station can determine, at 1012, a pair of beam candidates for the beam calibration measurements by the UE based on the report. For example, candidate component 1118 of apparatus 1102 may determine the pair of beam candidates for the beam calibration measurements. The base station, at 1014, may indicate the pair of beam candidates to the UE. For example, candidate component 1118 of apparatus 1102 may indicate the pair of beam candidates to the UE. In some examples, the base station can configure the UE, at 1016, with a transmission power for the beam calibration measurements for full duplex communication. For example, power component 1114 of apparatus 1102 may configure the UE with the transmission power for the beam calibration measurements.

The base station can further signal to the UE, at 1020, an indication of a sequence for the beam calibration measurements by the UE. For example, sequence component 1112 of apparatus 1102 may provide the UE with the indication of the sequence for the beam calibration measurements. The sequence may be selected by the base station, at 1018. For example, sequence component 1112 of apparatus 1102 may select the sequence. The sequence, e.g., signal, used by each UE associated with a base station may be either UE specific or base station specific. If two UEs are close to each other, then the signals can be UE specific and orthogonalized to ensure less interference across UEs. Thus, the base station may select a sequence based on the location of the UE or a location of UEs relative to each other. The sequence used by the UE to perform the full duplex calibration may be base station specific. Regardless of whether the sequence is UE specific or base station specific, the base station may select the sequence from a pool of sequences, e.g. from a pool of pseudo-random Walsh/Zadoff Chu/other orthogonal codes or sequences available for full duplex calibration.

Finally, at 1022, the base station can refrain from transmitting during the set of silent symbols. By avoiding transmitting during the silent symbols, the base station enables the UE to perform a calibration process. The calibration process may comprise aspects described in connection with FIG. 8.

Figure 11:
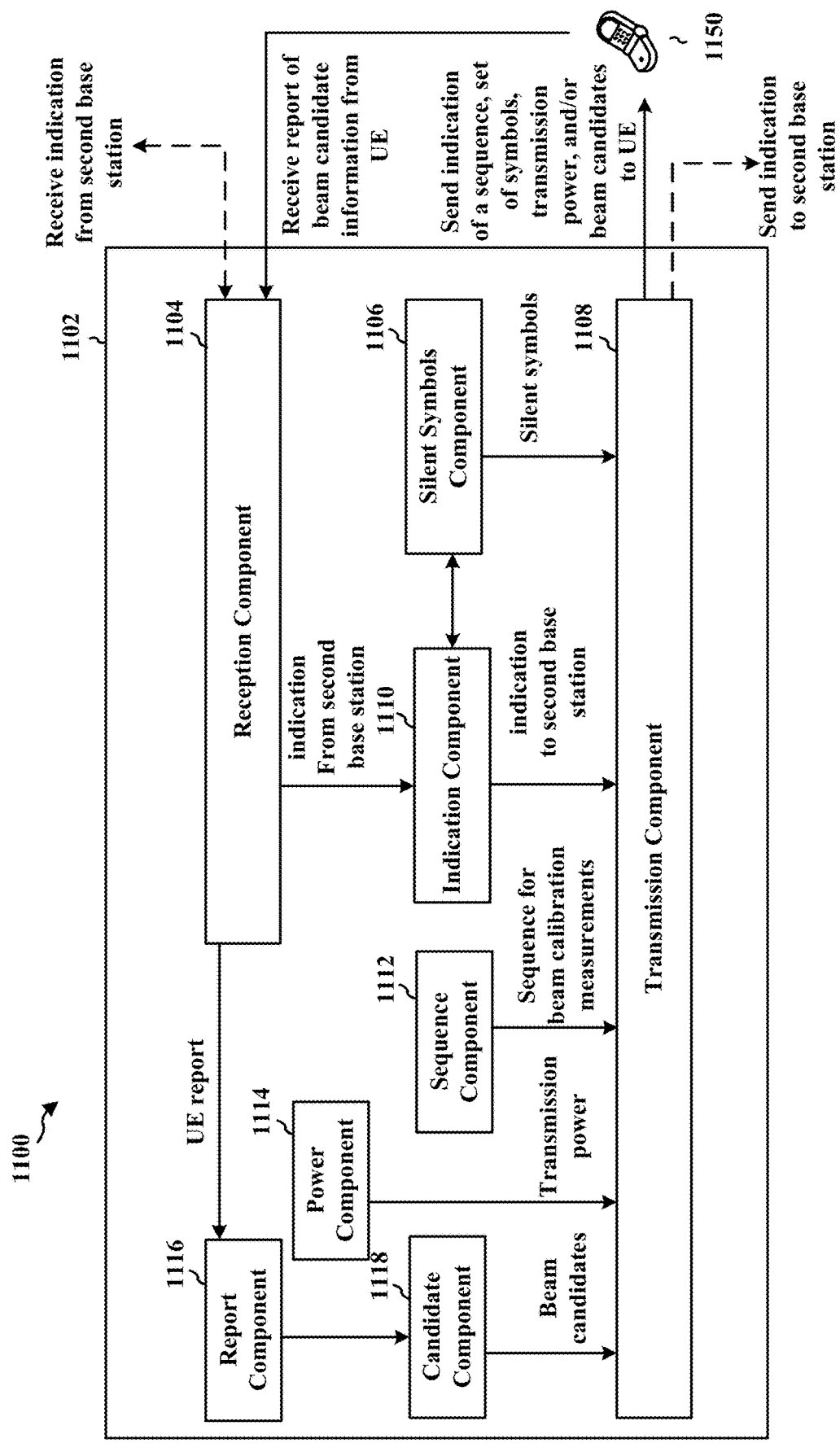
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a base station or a component of a base station (e.g., base station 102, 180, 310, 402, 506, 704, 904, 906, 1450, apparatus 1102/1102') in wireless communication with a UE 1150 (e.g., UE 104, 350, 404, 502, 702, 902, 1150, apparatus 1402/1402'). Alternatively, the apparatus may be a component of a base station. The apparatus includes a reception component 1104 that receives uplink communication from the UE 1150. The apparatus may comprise a silent symbols component 1106 that is configured to determine a set of silent symbols for beam calibration measurements by a UE for full duplex communication, e.g., as described in connection with 1002. The apparatus includes a transmission component 1108 that transmits downlink communications to the UE. The apparatus can be configured to refrain from transmitting downlink transmission during the set of silent symbols, such that the UE can perform the calibration procedure, e.g., as described in connection with 1022. The apparatus may include an indication component 1110 configured to receive an indication from a second base station to not transmit during the set of silent symbols, e.g., as described in connection with 1006. In some examples, the indication component 1110 may be configured to provide an indication to a second base station so as to not transmit during the set of silent symbols, e.g., as described in connection with 1004. In some examples, the apparatus can include report component 1116 configured to receive a report of beam candidate from the UE, e.g., as described in connection with 1010. The base station can determine a pair of beam candidates for the beam calibration measurements by the UE based on the report, e.g., via candidate component 1118, e.g., as described in connection with 1012. In such example, the candidate component 1118 can indicate the pair of beam candidates to the UE, e.g., as described in connection with 1014. In some examples, the apparatus can include a power component 1114 configured to provide an indication to configure the UE with a transmission power for the beam calibration measurements for full duplex communication, e.g., as described in connection with 1016. The apparatus can further include sequence component 1112 configured to select a sequence for beam candidate calibration measurements by the UE, e.g., as described in connection with 1018, and to signal to the UE an indication of a sequence for the beam calibration measurements by the UE, e.g., as described in connection with 1020.

The apparatus may include additional components that perform each of the blocks of the algorithm in the aforementioned flowcharts of FIGS. 9 and 10. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
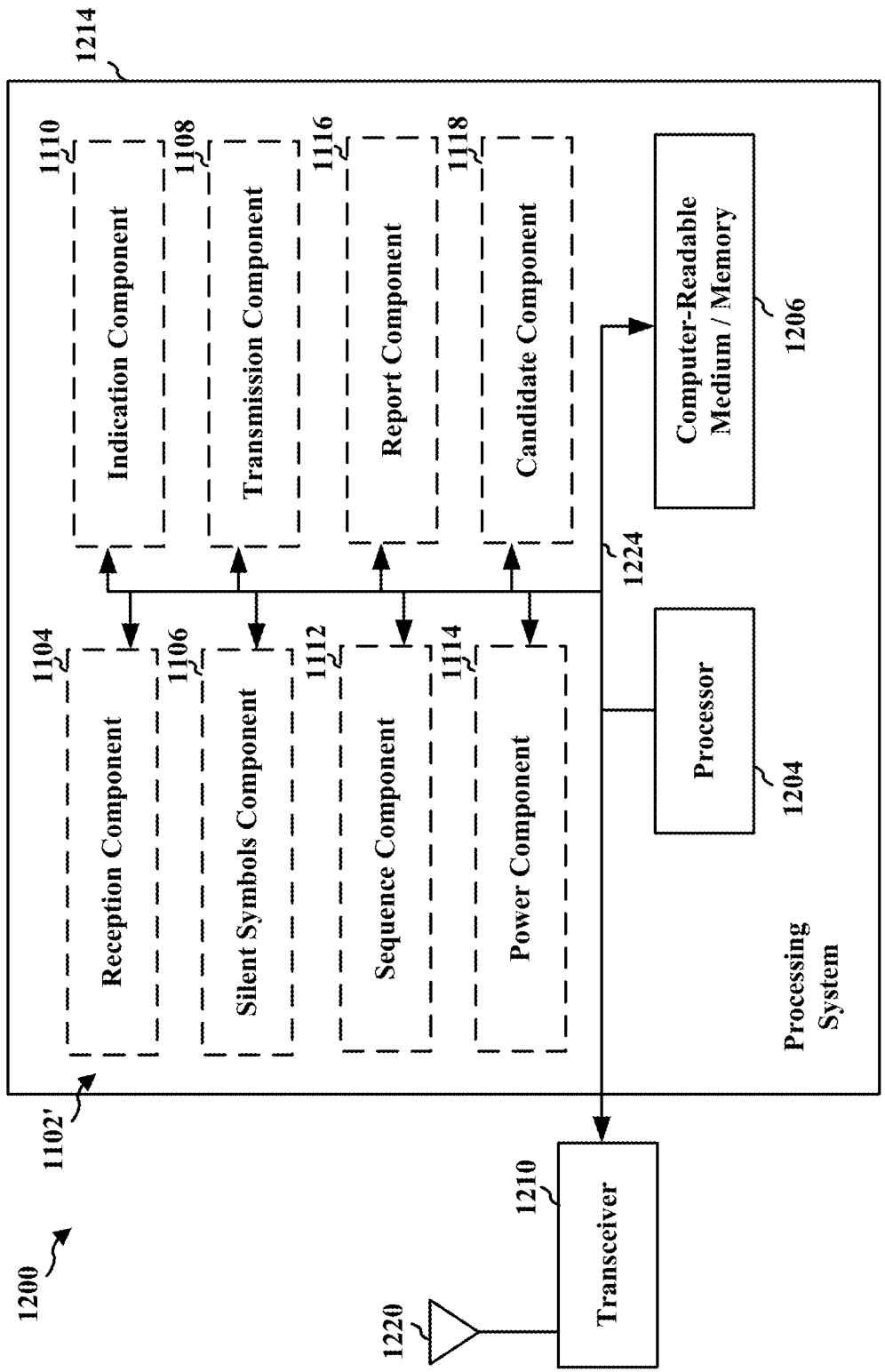
FIG. 12 is a diagram illustrating an example of a hardware implementation for an apparatus employing a processing system.

FIG. 12 is a diagram 1200 illustrating an example of a hardware implementation for an apparatus 1202' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116, 1118 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1108, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116, 1118. The components may be software components running in the processor 1204, resident/stored in the computer readable medium/memory 1206, one or more hardware components coupled to the processor 1204, or some combination thereof. The processing system 1214 may be a component of the base station 310 and may include the memory 376 and/or at least one of the TX processor 316, the RX processor 370, and the controller/processor 375. Alternatively, the processing system 1114 may comprise the entire base station (e.g., see 310 in FIG. 3).

In one configuration, the apparatus 1102/1102' for wireless communication includes means for determining a set of silent symbols for beam calibration measurements by a UE for full duplex communication. The apparatus may include means for transmitting, to the UE, an indication of the set of silent symbols for the beam calibration measurements by the UE. The apparatus may include means for refraining from transmitting during the set of silent symbols. The apparatus may further include means for receiving a first indication from a second base station or transmitting a second indication to the second base station to refrain from transmitting during the set of silent symbols in coordination with the second base station. The apparatus may further include means for receiving a report of beam candidate information from the UE. The apparatus may further include means for determining a pair of beam candidates for the beam calibration measurements by the UE based on the report. The apparatus may further include means for indicating the pair of beam candidates to the UE. The apparatus may further include means for configuring the UE with a transmission power for the beam calibration measurements for full duplex communication. The apparatus may further include means for signaling an indication of a sequence to the UE for the beam calibration measurements by the UE. The apparatus may further include means for selecting the sequence for the beam calibration measurements by the UE from a pool of sequences. The aforementioned means may be one or more of the aforementioned components of the apparatus 1102 and/or the processing system 1214 of the apparatus 1102' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 13:
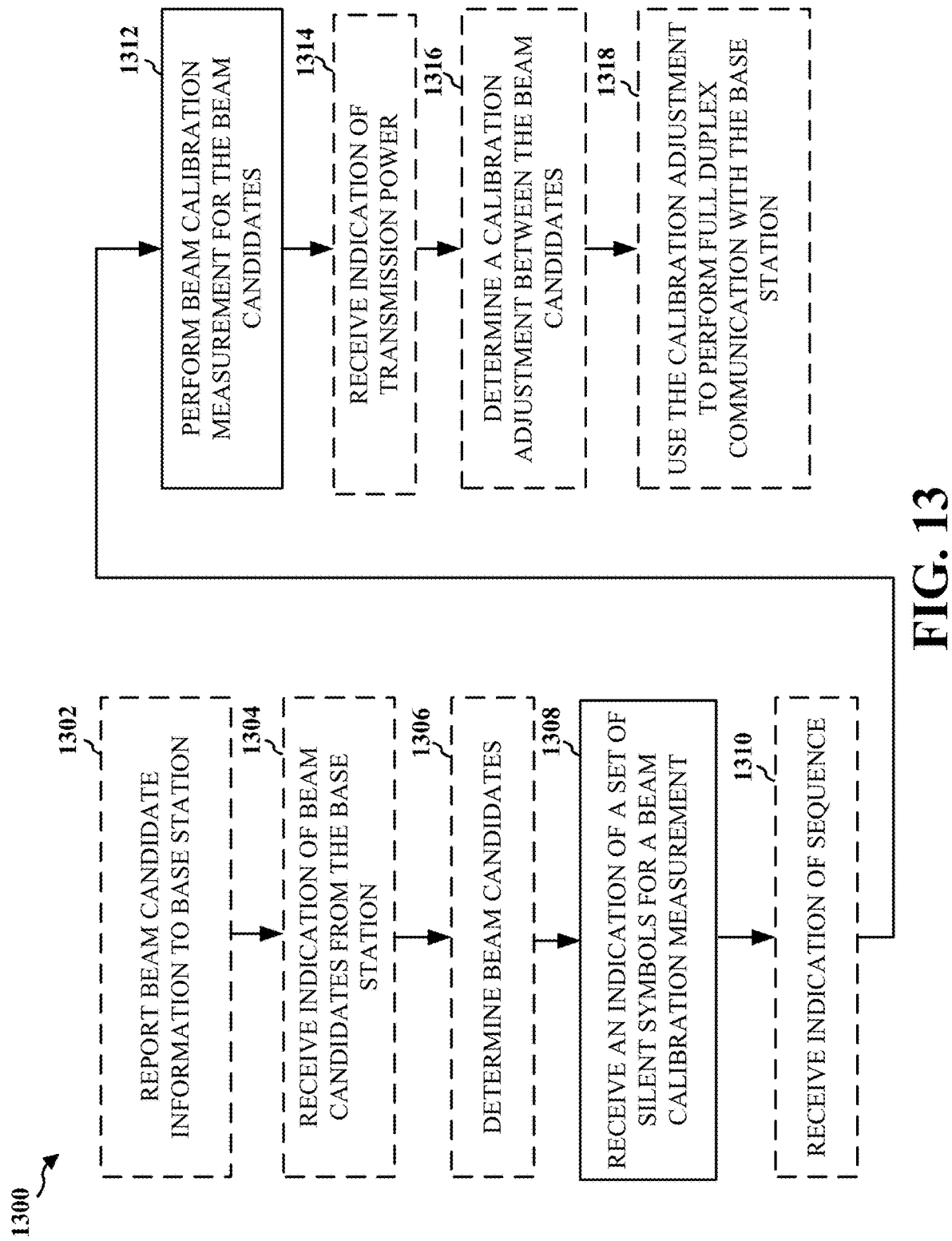
FIG. 13 is a flowchart of a method of wireless communication.

FIG. 13 is a flowchart 1300 of a method of wireless communication. The method may be performed by a UE (e.g., UE 104, 350, 404, 502, 702, 902, 1150; the apparatus 1402/1402'; the processing system 1514, which may include memory 360 and which may be the entire UE 350 or a component of the UE 350, such as TX processor 368, the RX processor 356, and/or the controller/processor 359) communicating with a base station (e.g., base station 102, 180, 310, 402, 506, 704, 904, 906, 1450; the apparatus 1102/1102'; the processing system 1214, which may include the memory 376 and which may be the entire base station 310 or a component of the base station 310, such as the TX processor 316, the RX processor 370, and/or the controller/processor 375). Optional aspects are illustrated with a dashed line. The method may allow a UE to perform online calibration of the uplink and downlink paths to calibrate the UE for full duplex communication.

At 1308, the UE may be receive an indication of a set of silent symbols for a beam calibration measurement by the UE for full duplex communication with a base station. For example, silent symbols component 1420 of apparatus 1402 may receive the indication. The silent symbols can be determined from a pool of sequences of silent symbols. In some examples, the silent symbols can include a set of contiguous silent symbols. In some examples, the set of silent symbols is unique to the UE. In some examples, the set of silent symbols is unique to the base station. The indication can be configured to indicate the beginning of the set of silent symbols and the duration of the set of silent symbols. In some examples, the indication of the set of silent symbols can be signaled to the UE using at least one of DCI, MAC-CE, or RRC.

At 1302, the UE may report the beam candidate information to the base station. For example, report component 1416 of apparatus 1402 may report the beam candidate information. For example, the UE may autonomously determine the beam candidates, at 1306. For example, beam candidate component 1406 of apparatus 1402 may determine the beam candidates. In other examples, at 1306, the UE may determine the beam candidates based on an indication of the beam candidates from the base station, received at 1304. For example, beam candidate component 1406 of apparatus 1402 may determine the beam candidates based on the indication of the beam candidates from the base station. Determining the beam candidates can include selecting a pair of uplink antenna subarray and a downlink antenna subarray for the full duplex communication. To determine the beam candidates, at 1306, the UE can select a beam pair for the full duplex communication, the beam pair including a transmission serving beam selected for use with the uplink antenna subarray and a reception serving beam selected for use with the downlink antenna subarray. In some examples, the UE further determines the beam candidates based on down at least one of capability information, channel information, data rate objectives, latency requirements, or power consumption information. The UE may determine the beam candidates based on the indication received from the base station.

At 1312, the UE may be configured to perform beam calibration measurements for the beam candidates. For example, beam measurement component 1408 of apparatus 1402 may perform the beam calibration measurements. Performing the beam calibration measurements may include transmitting a sequence of symbols using a transmission beam from a set of transmission beams during the set of silent symbols, and receiving the sequence of symbols using a reception beam from a set of reception beams during the set of silent symbols. In some examples, the UE transmits and receives the sequence of symbols during a set of contiguous symbols in which the base station does not transmit. The sequence of symbols may include a first number of contiguous symbols, the first number being at least twice as many as a second number of antenna subarrays within the beam candidates. The sequence of symbols may be unique to the UE. The sequence of symbols may be unique to the base station. The UE may receive an indication of a sequence to be used for full duplex calibration measurements, from the base station, at 1310. For example, sequence component 1414 of apparatus 1402 may receive the indication of the sequence to be used for full duplex calibration measurements. The sequence of symbols transmitted by the UE during the set of silent symbols may be unique to the UE, e.g., UE specific. In other examples, the sequence may be base station specific, e.g., common to multiple UEs served by the base station. The UE can be further configured to receive a configuration of a transmission power for the beam calibration measurements from the base station, at 1314 wherein the sequence of symbols is transmitted by the UE using the transmission power configured by the base station. For example, power component 1418 of apparatus 1402 may receive the configuration of the transmission power for the beam calibration measurements.

At 1316, the UE may determine a calibration adjustment between the beam candidates for full duplex communications. For example, calibration adjustment component 1410 of apparatus 1402 may determine the calibration adjustment. The calibration adjustment can be based on the sequence of symbols received at the UE. The calibration adjustment may include a phase adjustment based on a correlation of a transmit phase and a receive phase across a collection of antennas for the beam candidates. The calibration adjustment may include an amplitude adjustment based on a correlation of a transmit amplitude and a receive amplitude across a collection of antennas for the beam candidates.

At 1318, the UE can be configured to use the calibration adjustment to perform the full duplex communication with the base station using the beam candidates. Thus, the UE may transmit and/or receive communication with the base station after applying a calibration adjustment.

Figure 14:
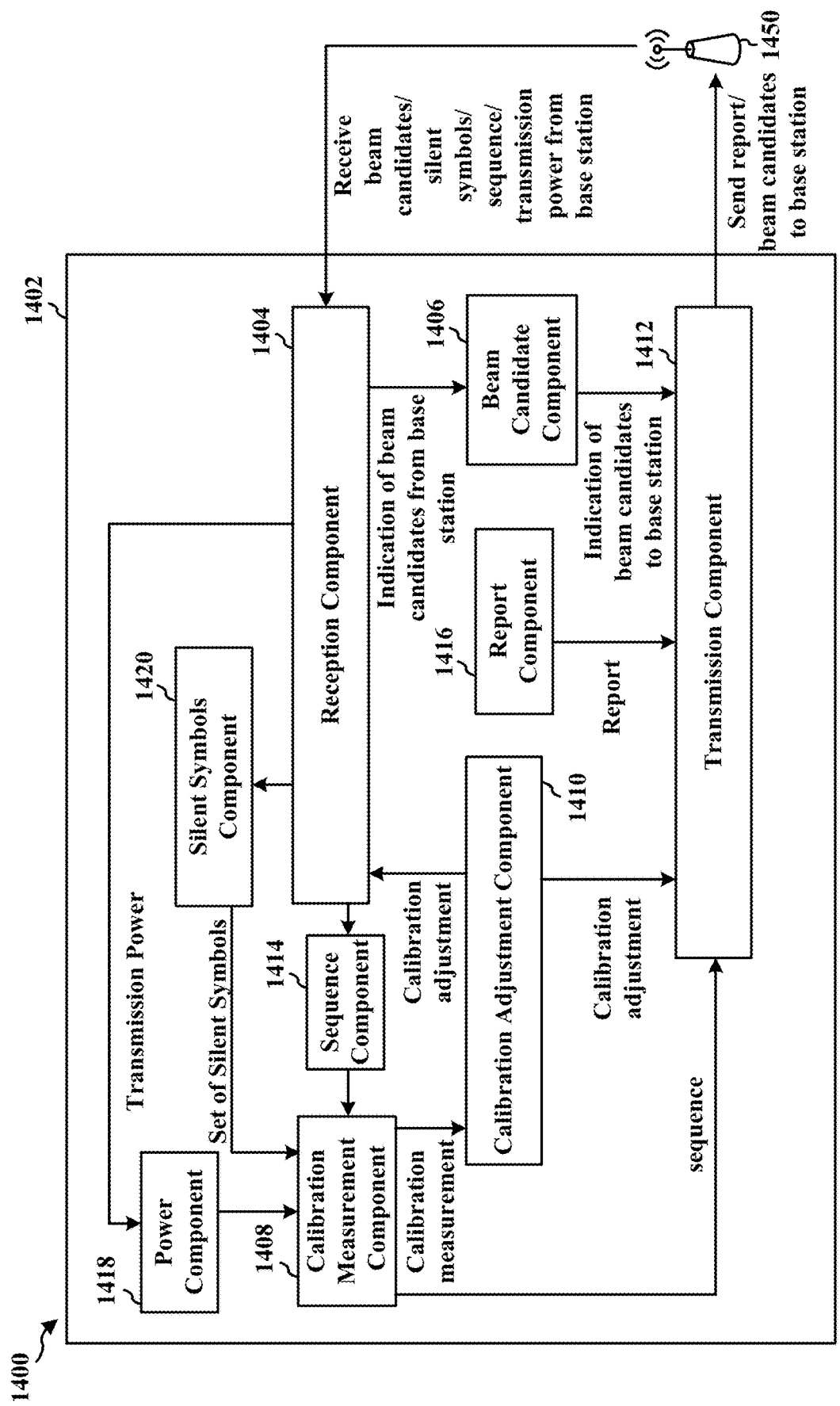
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus may be a UE or a component of a UE (e.g., UE 104, 350, 404, 502, 702, 902, 1150, apparatus 1402/1402') in wireless communication with base station (e.g., base station 102, 180, 310, 402, 506, 704, 904, 906, 1450, apparatus 1102/1102'). Alternatively, the apparatus may be a component of a UE. The apparatus includes a reception component 1404 that receives downlink communication from the base station 1450, and a transmission component 1412 that transmits uplink communications to the base station 1450. The apparatus may include a silent symbols component 1420 configured to receive an indication of a set of silent symbols for a beam calibration measurement by the UE for full duplex communication with the base station, e.g., as described in connection with 1308. The apparatus includes a beam candidate component 1406 that can be configured to determine the beam candidates, e.g., as described in connection with 1306. The beam candidate component can select a pair of an uplink antenna subarray and a downlink antenna subarray for the full duplex communication. Report component 1416 may be configured to report beam candidate information to the base station, e.g., as described in connection with 1302, and/or to receive an indication of the beam candidates from the base station based on UE reports, e.g., as described in connection with 1304. In some examples, the beam candidate component can determine the beam candidates based on the indication received from the base station. In some examples, the beam candidate component can determine the beam candidates based on down at least one of capability information, channel information, data rate objectives, latency requirements, or power consumption information. In some examples, the reception component 1404 may receive an indication of beam candidates from the base station 1450.

Beam measurement component 1408 is configured to perform beam calibration measurements for the beam candidates, e.g., as described in connection with 1312. The beam measurement component 1408 can be configured to transmit and receive the sequence of symbols during a set of silent symbols in which the base station does not transmit. In some examples, the base station can determine the set of silent symbols for beam calibration measurements by the UE from a pool of sequences of silent symbols. In some examples, the sequence of symbols can be unique to the UE. In some examples, the sequence of symbols can be unique to the base station. A power component 1418 may be configured to receive a configuration of a transmission power for the beam calibration measurements from the base station, e.g., as described in connection with 1314. The sequence of symbols is transmitted by the UE using the transmission power configured by the base station. The apparatus may include a sequence component 1414 configured to receive an indication of a sequence for the beam candidate measurement from the base station, e.g., as described in connection with 1310.

The apparatus includes a calibration adjustment component 1410 that can be configured to determine a calibration adjustment between the beam candidates for full duplex communications based on the sequence of symbols received at the UE, e.g., as described in connection with 1316. In some examples, the calibration adjustment can include a phase adjustment based on a correlation of a transmit phase and a receive phase across a collection of antennas for the beam candidates. In some examples, the calibration adjustment can include an amplitude adjustment based on a correlation of a transmit amplitude and a receive amplitude across a collection of antennas for the beam candidates. The calibration adjustment component may be further configured to perform the full duplex communication with the base station using the beam candidates.

Figure 15:
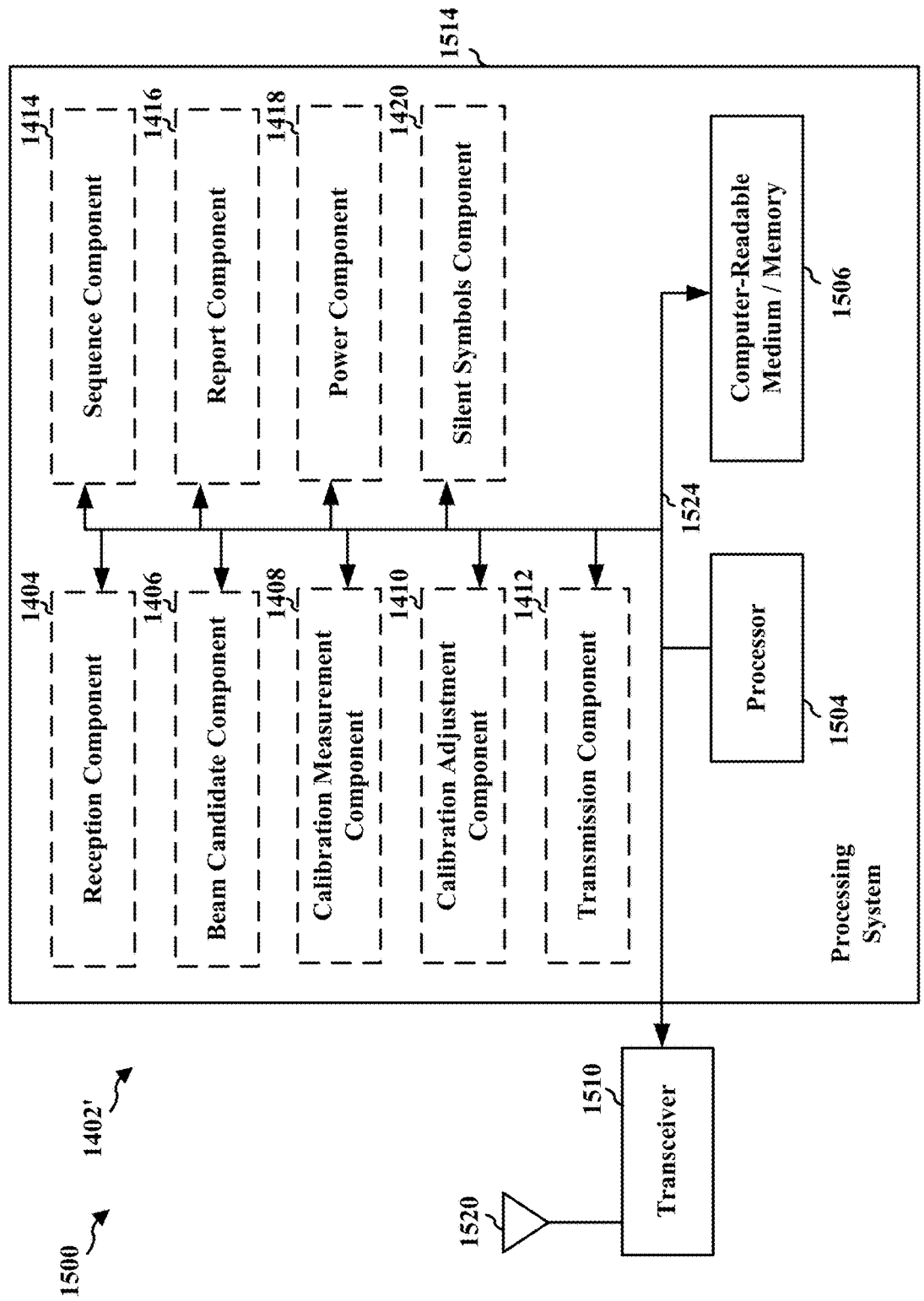
FIG. 15 is a diagram illustrating an example of a hardware implementation for an apparatus employing a processing system.

FIG. 15 is a diagram 1500 illustrating an example of a hardware implementation for an apparatus 1102' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 141, 1414, 1416, 1418, 1420 and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1412, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414, 1416, 1418, 1420. The components may be software components running in the processor 1504, resident/stored in the computer readable medium/memory 1506, one or more hardware components coupled to the processor 1504, or some combination thereof. The processing system 1514 may be a component of the UE 350 and may include the memory 360 and/or at least one of the TX processor 368, the RX processor 356, and the controller/processor 359. Alternatively, the apparatus may be the entire UE (e.g., see 350 in FIG. 3).

In one configuration, the apparatus 1402/1402' for wireless communication includes means for receiving an indication of a set of silent symbols for a beam calibration measurement by the UE for full duplex communication with a base station. The apparatus may include means for performing beam calibration measurements for the beam candidates. The apparatus may further include means for determining the beam candidates including selecting a pair of an uplink antenna subarray and a downlink antenna subarray for the full duplex communication. The apparatus may further include means for reporting beam candidate information to the base station. The apparatus may further include means for receiving an indication of the beam candidates from the base station based on UE reports. The UE determines the beam candidates based on the indication received from the base station. The apparatus may further include means for transmitting a sequence of symbols using a transmission beam from a set of transmission beams during the set of silent symbols. The apparatus may further include means for receiving the sequence of symbols using a reception beam from a set of reception beams during the set of silent symbols. The apparatus may further include means for receiving an indication of a sequence from the base station for the beam calibration measurements by the UE. The sequence of symbols transmitted by the UE during the set of silent symbols is unique to the UE. The apparatus may further include means for receiving a configuration of a transmission power for the beam calibration measurements from the base station. The sequence of symbols is transmitted by the UE using the transmission power configured by the base station. The apparatus may further include means for determining a calibration adjustment between the beam candidates for full duplex communications based on the sequence of symbols received at the UE. The apparatus may further include means for using the calibration adjustment to perform the full duplex communication with the base station using the beam candidates. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means. Alternatively, the apparatus may be the entire UE (e.g., see 350 in FIG. 3).

The following examples are illustrative only and may be combine with aspects of other embodiments or teachings herein, without limitation.

Example 1 is a method of wireless communication at a base station that includes determining a set of silent symbols for beam calibration measurements by a User Equipment (UE) for full duplex communication, transmitting, to the UE, an indication of the set of silent symbols for the beam calibration measurements by the UE, and refraining from transmitting during the set of silent symbols.

In Example 2, the method of example 1 further includes receiving a first indication from a second base station or transmitting a second indication to the second base station to refrain from transmitting during the set of silent symbols in coordination with the second base station.

In Example 3, the methods of any of examples 1-2 may include that the set of silent symbols includes at least one symbol.

In Example 4, the methods of any of examples 1-3 may include that the set of silent symbols comprises multiple contiguous symbols.

In Example 5, the methods of any of examples 1-4 may include that the set of silent symbols is selected by the base station in common for multiple UEs served by the base station.

In Example 6, the methods of any of examples 1-5 may include that the set of silent symbols is selected by the base station for a single UE.

In Example 7, the methods of any of examples 1-6 further includes receiving a report of beam candidate information from the UE, determining a pair of beam candidates for the beam calibration measurements by the UE based on the report, and indicating the pair of beam candidates to the UE.

In Example 8, the methods of any of examples 1-7 may include that the report comprises self-calibration measurements from the UE.

In Example 9, the methods of any of examples 1-8 may include that the base station determines the set of silent symbols for beam calibration measurements by the UE from a pool of sequences of silent symbols.

In Example 10, the methods of any of examples 1-9 further includes configuring the UE with a transmission power for the beam calibration measurements for full duplex communication.

In Example 11, the methods of any of examples of 1-10 may include that the indication of the set of silent symbols indicates the beginning of the set of silent symbols and the duration of the set of silent symbols.

In Example 12, the methods of any of examples of 1-11 may include that indication of the set of silent symbols is signaled to the UE using at least one of a downlink control information (DCI), a medium access control-control element (MAC-CE), or a radio resource control (RRC) signaling.

In Example 13, the methods of any of examples 1-12 further includes signaling an indication of a sequence to the UE for the beam calibration measurements by the UE.

In Example 14, the methods of any of examples 1-13 may include that the sequence comprises a base station specific sequence.

In Example 15, the methods of any of examples 1-14 may include that the sequence comprises a UE specific sequence.

In Example 16, the methods of any of examples 1-15 further includes selecting the sequence for the beam calibration measurements by the UE from a pool of sequences.

Example 17 is a system or apparatus including means for implementing a method or realizing an apparatus as in any of examples 1-16.

Example 18 is a device including one or more processors and memory in electronic communication with the one or more processors storing instructions executable by the one or more processors to cause the system or apparatus to implement a method as in any of examples 1-16.

Example 19 is a non-transitory computer readable medium storing instructions executable by one or more processors to cause the one or more processors to implement a method as in any of examples 1-16.

Example 20 is a method of wireless communication at a user equipment (UE) that includes receiving an indication of a set of silent symbols for a beam calibration measurement by the UE for full duplex communication with a base station, and performing beam calibration measurements for the beam candidates.

In Example 21, the method of example 20 further includes determining the beam candidates including selecting a pair of an uplink antenna subarray and a downlink antenna subarray for the full duplex communication.

In Example 22, the methods of any of examples 20-21 may include that determining the beam candidates further comprises selecting a beam pair for the full duplex communication, the beam pair comprising a transmission serving beam selected for use with the uplink antenna subarray and a reception serving beam selected for use with the downlink antenna subarray.

In Example 23, the methods of any of examples 20-22 may include that the UE determines the beam candidates based on down selection using at least one of capability information, channel information, data rate objectives, latency requirements, or power consumption information.

In Example 24, the methods of any of examples 20-23 further includes reporting beam candidate information to the base station, and receiving an indication of the beam candidates from the base station based on UE reports, where the UE determines the beam candidates based on the indication received from the base station.

In Example 25, the methods of any of examples 20-24 further includes transmitting a sequence of symbols using a transmission beam from a set of transmission beams during the set of silent symbols, and receiving the sequence of symbols using a reception beam from a set of reception beams during the set of silent symbols.

In Example 26, the methods of any of examples 20-25 may include that the base station determines the set of silent symbols for beam calibration measurements by the UE from a pool of sequences of silent symbols.

In Example 27, the methods of any of examples 20-26 may include that the silent symbols comprise a set of contiguous silent symbols in which the base station does not transmit.

In Example 28, the methods of any of examples 20-27 may include that the set of silent symbols is unique to the UE.

In Example 29, the methods of any of examples 20-28 may include that the set of silent symbols is unique to the base station.

In example 30, the methods of any of examples 20-29 may include receiving an indication of a sequence from the base station for the beam calibration measurements by the UE, wherein the sequence of symbols transmitted by the UE during the set of silent symbols is unique to the UE.

In example 31, the methods of any of examples 20-30 may include that the sequence comprises a base station specific sequence.

In Example 32, the methods of any of examples 20-31 may include that the sequence comprises a UE specific sequence.

In Example 33, the methods of any of examples 20-32 further includes receiving a configuration of a transmission power for the beam calibration measurements from the base station, wherein the sequence of symbols is transmitted by the UE using the transmission power configured by the base station.

In Example 34, the methods of any of examples 20-33 may include that the indication of the set of silent symbols indicates the beginning of the set of silent symbols and the duration of the set of silent symbols.

In Example 35, the methods of any of examples 20-34 may include that the indication of the set of silent symbols is signaled to the UE using at least one of a downlink control information (DCI), a medium access control-control element (MAC-CE), or a radio resource control (RRC) signaling.

In Example 36, the methods of any of examples 20-35 further includes determining a calibration adjustment between the beam candidates for full duplex communications based on the sequence of symbols received at the UE.

In Example 37, the methods of any of examples 20-36 may include that the calibration adjustment comprises a phase adjustment based on a correlation of a transmit phase and a receive phase across a collection of antennas for the beam candidates.

In Example 38, the methods of any of examples 20-37 may include that the calibration adjustment comprises an amplitude adjustment based on a correlation of a transmit amplitude and a receive amplitude across a collection of antennas for the beam candidates.

In Example 39, the method of any of examples 20-38 further includes using the calibration adjustment to perform the full duplex communication with the base station using the beam candidates.

Example 40 is a system or apparatus including means for implementing a method or realizing an apparatus as in any of examples 20-39.

Example 44 is a device including one or more processors and memory in electronic communication with the one or more processors storing instructions executable by the one or more processors to cause the system or apparatus to implement a method as in any of examples 20-39.

Example 42 is a non-transitory computer readable medium storing instructions executable by one or more processors to cause the one or more processors to implement a method as in any of examples 20-39.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
    receiving information regarding a beam calibration mode from a User Equipment (UE), the information comprises an indication of a need to perform calibration for full duplex communication;
    determining a set of silent symbols for beam calibration measurements by the UE for full duplex communication from a pool comprising a plurality of sequences of silent symbols, wherein the determined set of silent symbols includes fewer silent symbols than the plurality of sequences of silent symbols;
    transmitting, to the UE, an indication of the set of silent symbols for the beam calibration measurements by the UE, wherein the transmitting the indication of the set of silent symbols comprises transmitting based on the receiving the information;
    configuring the UE with a transmission power for the beam calibration measurements for the full duplex communication during the set of silent symbols; and
    refraining from transmitting during the set of silent symbols,
    with the set of silent symbols comprising at least one silent symbol,
    wherein the UE is trained with a first set of the set of silent symbols and calibrated with a second set of the set of silent symbols.

2. The method of claim 1, further comprising:
    receiving a first indication from a second base station or transmitting a second indication to the second base station to refrain from transmitting during the set of silent symbols in coordination with the second base station.

3. The method of claim 1, wherein the set of silent symbols comprises multiple contiguous symbols.

4. The method of claim 1, wherein the set of silent symbols is selected by the base station for a single UE.

5. The method of claim 1, further comprising:
receiving a report of beam candidate information from the UE;
determining a pair of beam candidates for the beam calibration measurements by the UE based on the report; and
indicating the pair of beam candidates to the UE.

6. The method of claim 5, wherein the report comprises self-calibration measurements from the UE.

7. The method of claim 1, wherein the indication of the set of silent symbols indicates a beginning of a set of silent symbols and a duration of the set of silent symbols.

8. The method of claim 7, wherein the indication of the set of silent symbols is signaled to the UE using at least one of a downlink control information (DCI), or a medium access control-control element (MAC-CE).

9. The method of claim 1, further comprising:
signaling an additional indication of a sequence to the UE for the beam calibration measurements by the UE.

10. The method of claim 9, wherein the sequence comprises a base station specific sequence.

11. The method of claim 9, wherein the sequence comprises a UE specific sequence.

12. The method of claim 9, further comprising:
selecting the sequence for the beam calibration measurements by the UE from a pool of sequences.

13. The method of claim 1, wherein the information comprises an indication of a capability to perform full duplex communication.

14. An apparatus for wireless communication at a base station, comprising:
means for receiving information regarding a beam calibration mode from a User Equipment (UE), the information comprises an indication of a need to perform calibration for full duplex communication;
means for determining a set of silent symbols for beam calibration measurements by the UE for full duplex communication from a pool comprising a plurality of sequences of silent symbols, wherein the determined set of silent symbols includes fewer silent symbols than the plurality of sequences of silent symbols;
means for transmitting, to the UE, an indication of the set of silent symbols for the beam calibration measurements by the UE, wherein the means for transmitting the indication of the set of silent symbols comprises means for transmitting based on the information regarding the beam calibration;
means for configuring the UE with a transmission power for the beam calibration measurements for the full duplex communication; and
means for refraining from transmitting during the set of silent symbols,
with the set of silent symbols comprising at least one silent symbol,
wherein the UE is trained with a first set of the set of silent symbols and calibrated with a second set of the set of silent symbols.

15. The apparatus of claim 14, further comprising:
means for receiving a first indication from a second base station or transmitting a second indication to the second base station to refrain from transmitting during the set of silent symbols in coordination with the second base station.

16. The apparatus of claim 14, further comprising:
means for receiving a report of beam candidate information from the UE;
means for determining a pair of beam candidates for the beam calibration measurements by the UE based on the report; and
means for indicating the pair of beam candidates to the UE.

17. The apparatus of claim 14, wherein the information comprises an indication of a capability to perform full duplex communication.

18. An apparatus for wireless communication at a base station, comprising:
a memory; and
at least one processor coupled to the memory and configured to:
receive information regarding a beam calibration mode from a User Equipment (UE), the information comprises an indication of a need to perform calibration for full duplex communication;
determine a set of silent symbols for beam calibration measurements by the UE for full duplex communication from a pool comprising a plurality of sequences of silent symbols, wherein the determined set of silent symbols includes fewer silent symbols than the plurality of sequences of silent symbols;
transmit, to the UE, an indication of the set of silent symbols for the beam calibration measurements by the UE, wherein the transmitting the indication of the set of silent symbols comprises transmitting based on the receiving the information;
configure the UE with a transmission power for the beam calibration measurements for the full duplex communication; and
refrain from transmitting during the set of silent symbols,
with the set of silent symbols comprising at least one silent symbol,
wherein the UE is trained with a first set of the set of silent symbols and calibrated with a second set of the set of silent symbols.

19. The apparatus of claim 18, wherein the at least one processor is further configured to:
receive a first indication from a second base station or transmitting a second indication to the second base station to refrain from transmitting during the set of silent symbols in coordination with the second base station.

20. The apparatus of claim 18, wherein the at least one processor is further configured to:
receive a report of beam candidate information from the UE;
determine a pair of beam candidates for the beam calibration measurements by the UE based on the report; and
indicate the pair of beam candidates to the UE.

21. The apparatus of claim 18, wherein the information comprises an indication of a capability to perform full duplex communication.

22. A method of wireless communication at a user equipment (UE), comprising:
transmitting information regarding a beam calibration mode of the UE to a base station, the information comprises an indication of a need to perform calibration for full duplex communication;
receiving an indication of a set of silent symbols, as determined from a pool comprising a plurality of sequences of silent symbols for a beam calibration measurement by the UE for full duplex communication with the base station, wherein the determined set of silent symbols includes fewer silent symbols than the plurality of sequences of silent symbols;

receiving a configuration of a transmission power for the beam calibration measurements from the base station;

performing beam calibration measurements for beam candidates during the set of silent symbols, with the set of silent symbols comprising at least one silent symbol;

training the UE with a first set of the set of silent symbols; and calibrating the UE with a second set of the set of silent symbols.

23. The method of claim 22, further comprising:
determining the beam candidates including selecting a pair of an uplink antenna subarray and a downlink antenna subarray for the full duplex communication.

24. The method of claim 23, wherein determining the beam candidates further comprises selecting a beam pair for the full duplex communication, the beam pair comprising a transmission serving beam selected for use with the uplink antenna subarray and a reception serving beam selected for use with the downlink antenna subarray.

25. The method of claim 23, wherein the UE determines the beam candidates based on down selection using at least one of capability information, channel information, data rate objectives, latency requirements, or power consumption information.

26. The method of claim 23, further comprising:
reporting beam candidate information to the base station; and receiving a beam candidate indication of the beam candidates from the base station based on UE reports, wherein the UE determines the beam candidates based on the beam candidate indication received from the base station.

27. The method of claim 22, wherein performing the beam calibration measurements for the beam candidates comprises:

transmitting a sequence of symbols using a transmission beam from a set of transmission beams during the set of silent symbols; and receiving the sequence of symbols using a reception beam from a set of reception beams during the set of silent symbols.

28. The method of claim 22, wherein the information comprises an indication of a capability to perform full duplex communication.

29. An apparatus for wireless communication at a user equipment (UE), comprising:
a memory; and
at least one processor coupled to the memory and configured to:
transmit information regarding a beam calibration mode of the UE to a base station, the information comprises an indication of a need to perform calibration for full duplex communication;
receive an indication of a set of silent symbols, as determined from a pool comprising a plurality of sequences of silent symbols, for a beam calibration measurement by the UE for full duplex communication with the base station, wherein the determined set of silent symbols includes fewer silent symbols than the plurality of sequences of silent symbols;
receive a configuration of a transmission power for the beam calibration measurements from the base station; and
perform beam calibration measurements for beam candidates during the set of silent symbols,
with the set of silent symbols comprising at least one silent symbol;
train the UE with a first set of the set of silent symbols; and
calibrate the UE with a second set of the set of silent symbols.

30. The apparatus of claim 29, wherein the at least one processor is further configured to:
determine the beam candidates including selecting a pair of an uplink antenna subarray and a downlink antenna subarray for the full duplex communication.

31. The apparatus of claim 30, wherein determining the beam candidates further comprises selecting a beam pair for the full duplex communication, the beam pair comprising a transmission serving beam selected for use with the uplink antenna subarray and a reception serving beam selected for use with the downlink antenna subarray.

32. The apparatus of claim 29, wherein the information comprises an indication of a capability to perform full duplex communication.

* * * * *